(12) United States Patent
Morellas et al.

(10) Patent No.: US 7,720,257 B2
(45) Date of Patent: May 18, 2010

(54) OBJECT TRACKING SYSTEM

(75) Inventors: Vassilios Morellas, Plymouth, MN (US); Michael E. Bazakos, Bloomington, MN (US); Yunqian Ma, Roseville, MN (US); Andrew Johnson, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 1371 days.

(21) Appl. No.: 11/154,839

(22) Filed: Jun. 16, 2005

(65) Prior Publication Data

US 2006/0285723 A1 Dec. 21, 2006

(51) Int. Cl.
*G06K 9/00* (2006.01)
*H04N 7/18* (2006.01)

(52) U.S. Cl. .................... 382/103; 382/154; 348/143; 348/152

(58) Field of Classification Search .............. 382/100, 382/103, 115–118, 154; 348/42, 94, 143, 348/149, 152–156
See application file for complete search history.

(56) References Cited

U.S. PATENT DOCUMENTS

| | | | | |
|---|---|---|---|---|
| 5,245,675 A | * | 9/1993 | Ferre et al. ................... | 382/159 |
| 5,396,284 A | | 3/1995 | Freeman | |
| 5,434,617 A | * | 7/1995 | Bianchi ....................... | 348/170 |
| 5,473,369 A | * | 12/1995 | Abe ............................. | 348/169 |
| 5,610,653 A | * | 3/1997 | Abecassis ..................... | 348/170 |
| 5,655,028 A | * | 8/1997 | Soll et al. .................... | 382/133 |
| 5,715,166 A | * | 2/1998 | Besl et al. ..................... | 700/182 |
| 5,724,435 A | * | 3/1998 | Malzbender ................. | 382/103 |
| 5,724,475 A | * | 3/1998 | Kirsten ........................ | 386/109 |
| 5,845,009 A | * | 12/1998 | Marks et al. ................. | 382/228 |
| 6,011,901 A | * | 1/2000 | Kirsten ........................ | 386/123 |
| 6,049,281 A | | 4/2000 | Osterweil | |
| 6,100,893 A | * | 8/2000 | Ensz et al. ................... | 345/420 |
| 6,215,519 B1 | | 4/2001 | Nayar et al. | |
| 6,359,647 B1 | | 3/2002 | Sengupta et al. | |
| 6,370,260 B1 | | 4/2002 | Pavlidis et al. | |
| 6,437,819 B1 | | 8/2002 | Loveland | |
| 6,445,298 B1 | | 9/2002 | Shepher | |
| 6,483,935 B1 | | 11/2002 | Rostami et al. | |

(Continued)

FOREIGN PATENT DOCUMENTS

EP   1465115   6/2004

(Continued)

OTHER PUBLICATIONS

Burt, et al., "The Laplacian Pyramid as a Compact Image Code," IEEE Transactions on Communications, vol. COM-31, No. 4, pp. 532-540, Apr. 1983.

(Continued)

*Primary Examiner*—Manav Seth
(74) *Attorney, Agent, or Firm*—Brian N. Tufte; Crompton Seager & Tufte, LLC

(57) ABSTRACT

A system for tracking objects across an area having a network of cameras with overlapping and non-overlapping fields of view. The system may use a combination of color, shape, texture and/or multi-resolution histograms for object representation or target modeling for the tacking of an object from one camera to another. The system may include user and output interfacing.

14 Claims, 26 Drawing Sheets

U.S. PATENT DOCUMENTS

| | | | |
|---|---|---|---|
| 6,499,025 B1 | 12/2002 | Horvitz et al. | |
| 6,504,482 B1 | 1/2003 | Mori et al. | |
| 6,532,299 B1* | 3/2003 | Sachdeva et al. | 382/128 |
| 6,542,621 B1* | 4/2003 | Brill et al. | 382/103 |
| 6,611,206 B2 | 8/2003 | Milanski et al. | |
| 6,678,413 B1 | 1/2004 | Liang et al. | |
| 6,718,049 B2 | 4/2004 | Pavlidis et al. | |
| 6,795,567 B1* | 9/2004 | Cham et al. | 382/103 |
| 6,882,959 B2* | 4/2005 | Rui et al. | 702/179 |
| 6,950,123 B2* | 9/2005 | Martins | 348/157 |
| 6,985,620 B2* | 1/2006 | Sawhney et al. | 382/154 |
| 6,999,601 B2* | 2/2006 | Pavlovic et al. | 382/103 |
| 7,035,764 B2* | 4/2006 | Rui et al. | 702/179 |
| 7,072,494 B2* | 7/2006 | Georgescu et al. | 382/103 |
| 7,184,071 B2* | 2/2007 | Chellappa et al. | 348/46 |
| 7,283,668 B2* | 10/2007 | Moon et al. | 382/168 |
| 7,286,157 B2* | 10/2007 | Buehler | 348/143 |
| 7,336,803 B2* | 2/2008 | Mittal et al. | 382/103 |
| 7,376,246 B2* | 5/2008 | Shao et al. | 382/103 |
| 7,418,113 B2* | 8/2008 | Porikli et al. | 382/103 |
| 7,486,815 B2* | 2/2009 | Kristjansson et al. | 382/154 |
| 7,522,186 B2* | 4/2009 | Arpa et al. | 348/153 |
| 2002/0063711 A1 | 5/2002 | Park et al. | |
| 2002/0075258 A1 | 6/2002 | Park et al. | |
| 2002/0076087 A1 | 6/2002 | You et al. | |
| 2002/0105578 A1 | 8/2002 | Hunter | |
| 2002/0140822 A1 | 10/2002 | Kahn et al. | |
| 2002/0180759 A1 | 12/2002 | Park et al. | |
| 2003/0040815 A1 | 2/2003 | Pavlidis | |
| 2003/0053658 A1 | 3/2003 | Pavlidis | |
| 2003/0053659 A1 | 3/2003 | Pavlidis | |
| 2003/0053664 A1 | 3/2003 | Pavlidis et al. | |
| 2003/0076417 A1 | 4/2003 | Thomas et al. | |
| 2003/0095186 A1 | 5/2003 | Aman et al. | |
| 2003/0123703 A1* | 7/2003 | Pavlidis et al. | 382/103 |
| 2003/0179294 A1 | 9/2003 | Martins | |
| 2003/0209893 A1 | 11/2003 | Breed et al. | |
| 2004/0030531 A1 | 2/2004 | Miller | |
| 2004/0104935 A1* | 6/2004 | Williamson et al. | 345/757 |
| 2004/0240711 A1 | 12/2004 | Hamza et al. | |
| 2005/0055582 A1 | 3/2005 | Bazakos et al. | |
| 2005/0110610 A1 | 5/2005 | Bazakos et al. | |

FOREIGN PATENT DOCUMENTS

| | | |
|---|---|---|
| WO | 03051059 | 6/2003 |

OTHER PUBLICATIONS

Caspi, et al., "Alignment of Non-Overlapping Sequences," 8 pages, prior to filing date of present application.
Cockshott, et al., "Microscopic Volumetric Image Data Compression Using Vector Quantization and 3D Pyramid," 5 pages, prior to filing date of present application.
http://www.merl.com/projects/MultiCamera/, "Multi-Camera Systems," 2 pages, printed Jan. 19, 2004.
Javed, et al., "Knight$^M$: A Real Time Surveillance System for Multiple Overlapping and Non-Overlapping Cameras," 4 pages, prior to filing date of present application.
Javed, et al., "Tracking Across Multiple Cameras with Disjoint Views," Proceedings of the Ninth IEEE International Conference on Computer Vision, 6 pages, 2003.
Kettnaker, et al., "Bayesian Multi-Camera Surveillance," IEEE, 7 pages, 1999.
Khan, et al., "Consistent Labeling of Tracked Objects in Multiple Cameras with Overlapping Fields of View," 27 pages, Apr. 25, 2002.
Khan, et al., "Human Tracking in Multiple Cameras," 6 pages, prior to filing date of present application.
Khan, et al., "Tracking in Uncalibrated Cameras with Overlapping Field of View," 8 pages, prior to filing date of present application.
Kogut, et al., "A Wide Area Tracking System for Vision Sensor Networks," 9th World Congress on Intelligent Transport Systems, 11 pages, 2002.
Porikli, et al., "Multi-Camera Calibration, Object Tracking and Query Generation," Mitsubishi Electric Research Labs, 4 pages, prior to filing date of present application.
Pavlidis et al., "A Near-Infrared Fusion Scheme for Automatic Detection of Vehicle Passengers," pp. 1-8, prior to Oct. 20, 2005.
Pavlidis et al., "Urban Surveillance Systems: From the Laboratory to the Commercial World," pp. 1-18, prior to Oct. 20, 2005.
Pavlidis et al., "Automatic Passenger Counting in the High Occupany Vehicle (HOV) Lanes," 19 pages, prior to Oct. 20, 2005.
Quian et al., "Structure From Motion Using Sequential Monte Carlo Methods," Kluwer Academic Publishers, pp. 1-54, 2004.
Selinger et al., "Appearance-Based Facial Recognition Using Visible and Thermal Imagery: A Comparative Study," 28 pages, prior to filing date of present application.
Socolinsky et al., "Illumination Invariant Face Recognition Using Thermal Infrared Imagery," 8 pages, prior to Oct. 20, 2005.
Xu et al., "Pedestrian Detection and Tracking with Night Vision," 10 pages, prior to Oct. 20, 2005.
Hue, et al., "A Particle Filter to Track Multiple Objects," IEEE, pp. 61-68, 2001.
Caspi, et al., "Alignment of Non-Overlapping Sequences," 8 pages, prior to filing date of present application, 2001.
Cockshott, et al., "Microscopic Volumetric Image Data Compression Using Vector Quantization and 3D Pyramid," 5 pages, prior to filing date of present application, 2005.
Javed, et al., "Knight$^M$: A Real Time Surveillance System for Multiple Overlapping and Non-Overlapping Cameras," 4 pages, prior to filing date of present application, 2003.
Khan, et al., "Human Tracking in Multiple Cameras," 6 pages, prior to filing date of present application, 2001.
Khan, et al., "Tracking in Uncalibrated Cameras with Overlapping Field of View," 8 pages, prior to filing date of present application, 2001.
Porikli, et al., "Multi-Camera Calibration, Object Tracking and Query Generation," Mitsubishi Electric Research Labs, 4 pages, prior to filing date of present application, 2003.
"Burt Adelson Pyramid," 3 pages, on or before Mar. 4, 2005.
"CBVBS '01 Final Program" 2 pages, 2001.
Albiol et al., "Robust Motion Detection for Video Surveillance Applications," IEEE, International Conference on Image Processing, 5 pages, Sep. 2003.
Chen et al., "Comparison and Combination of Visible and IR Image Face Recognition," 18 pages, prior to Oct. 20, 2005.
Cutler, "Face Recoginition Using Infrared Images and Eigenfaces," pp. 1-5, Apr. 26, 1996.
Dowdall et al., "A Face Detetion Method Based on Multi-Band Feature Extraction in the Near-IR Spectrum," 9 pages, prior to Oct. 20, 2005.
Dowdall et al., "Face Detection in the Near-IR Spectrum," 15 pages, prior to Oct. 20, 2005.
Fromherz et al., "A Survey of Face Recognition," pp. 1-18, prior to Oct. 20, 2005.
Gibbons et al., "IrisNet: An Architecture for Internet-Scale Sensing," pp. 1-10, prior to Oct. 20, 2005.
http://esdl.computer.org/comp/proceedings/fg/1996/7713/00/77131082abs.htm, "Comparison of visible and infra-red imagery for face recognition," 1 page, printed Jan. 20, 2004.
http://www.cc.gatech.edu/classes/AY200/cs7495_fall/participants/iwc/paperpres/Visible..."Comparison of Visible and Infra-Red Imagery for Face Recognition," 3 pages, printed Jan. 20, 2004.
Morimoto et al., "Pupil Detection and Tracking Using Multiple Light Sources," Image and Vision Computing, 18, pp. 331-335, 2000.
Nath et al., "IrisNet: An Architecture for Enabling Sensor -Enriched Internet Service," pp. 1-15, Dec. 2002.
Selinger et al., "Appearance-Based Facial Recognition Using Visible and Thermal Imagery: A Comparative Study," 28 pages, prior to filing date of present application, 2001.

\* cited by examiner

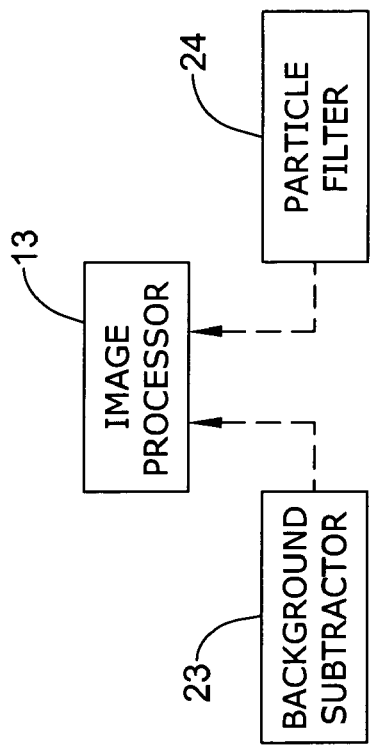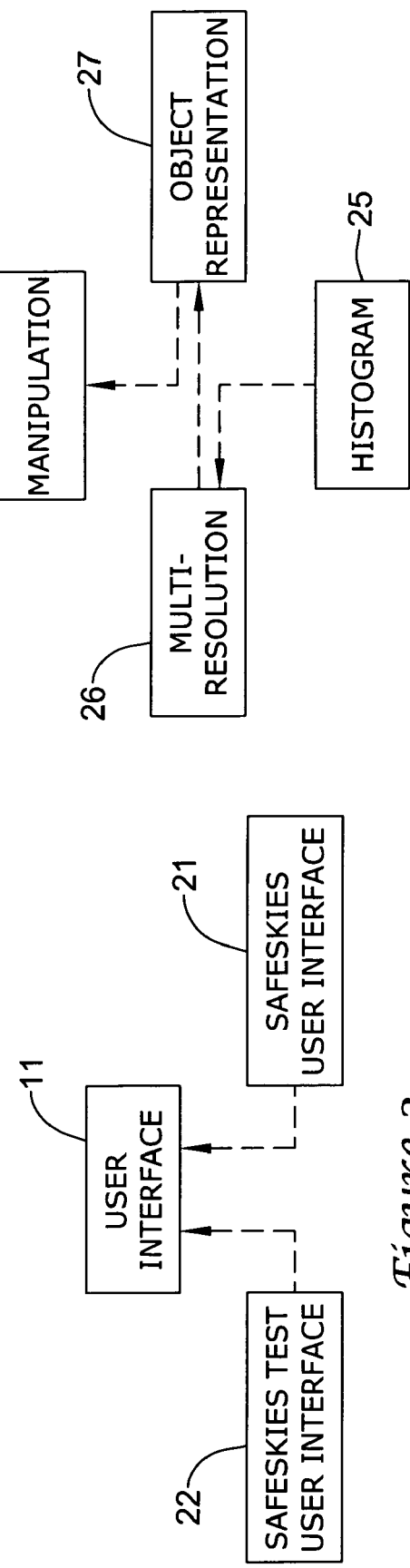

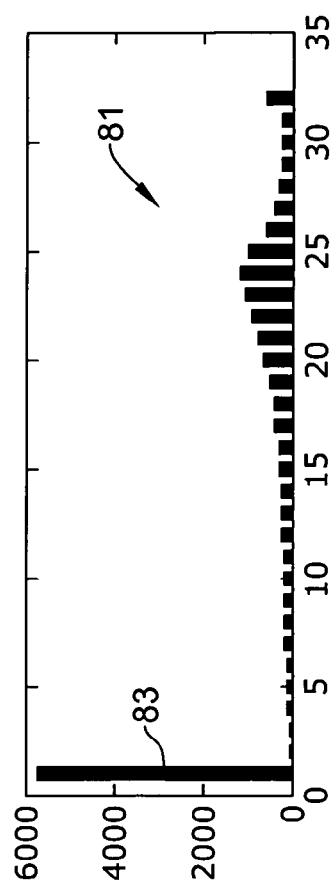
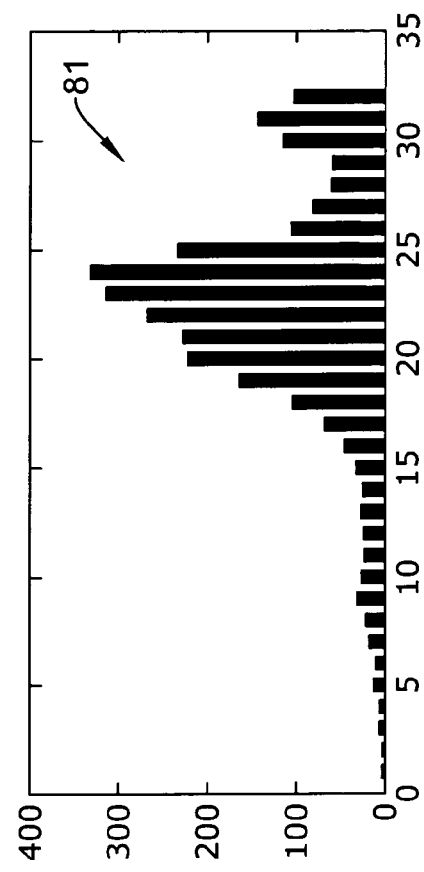
Figure 18A — pure histogram
Figure 18B — histogram of only the foreground

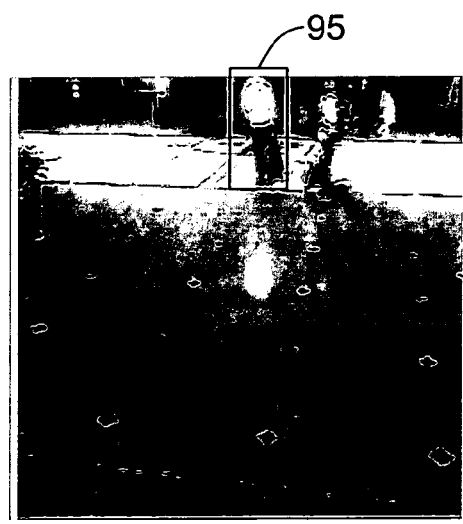
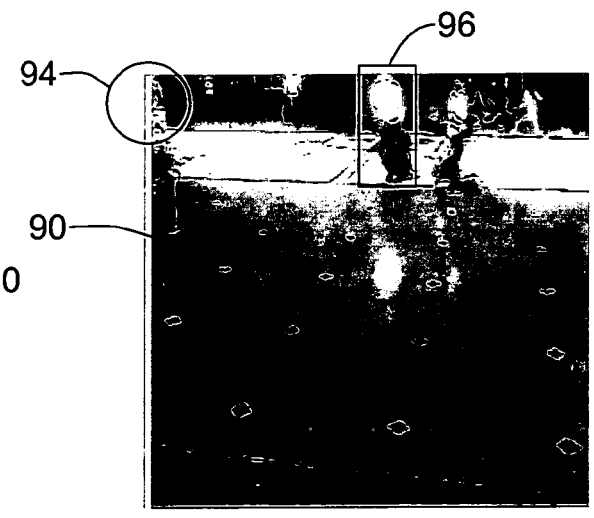
Figure 26A  Figure 27A
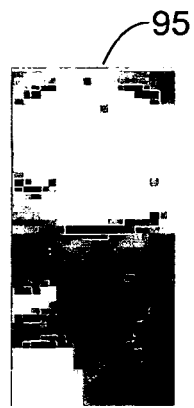
Figure 26B  Figure 27B

OBJECT TRACKING SYSTEM

BACKGROUND

The invention pertains to monitoring and particularly to camera-based monitoring. More particularly, the invention pertains to tracking objects across networks of cameras.

SUMMARY

The invention includes camera networks for tracking objects across various fields-of-view and a processor for noting the tracking of the objects within its field-of-view.

BRIEF DESCRIPTION OF THE DRAWING

FIG. 2 shows components of an example user interface;

FIG. 3 shows the basic components of an image processor;

FIG. 4 reveals a basis of object manipulation having a histogram, multi-resolution and object representation;

FIGS. 18a and 18b are graphs showing an effect of background subtraction from a scene having a target object;

FIGS. 26a and 27a show selected frames from the series of frames in FIG. 25;

FIGS. 26b and 27b show a target patch of the frame in FIG. 26a and a selected image of the frame in FIG. 27a, respectively;

FIG. 28 shows a matching score for same size sub-windows of the frame shown in FIG. 27a;

DESCRIPTION

Figure 1:
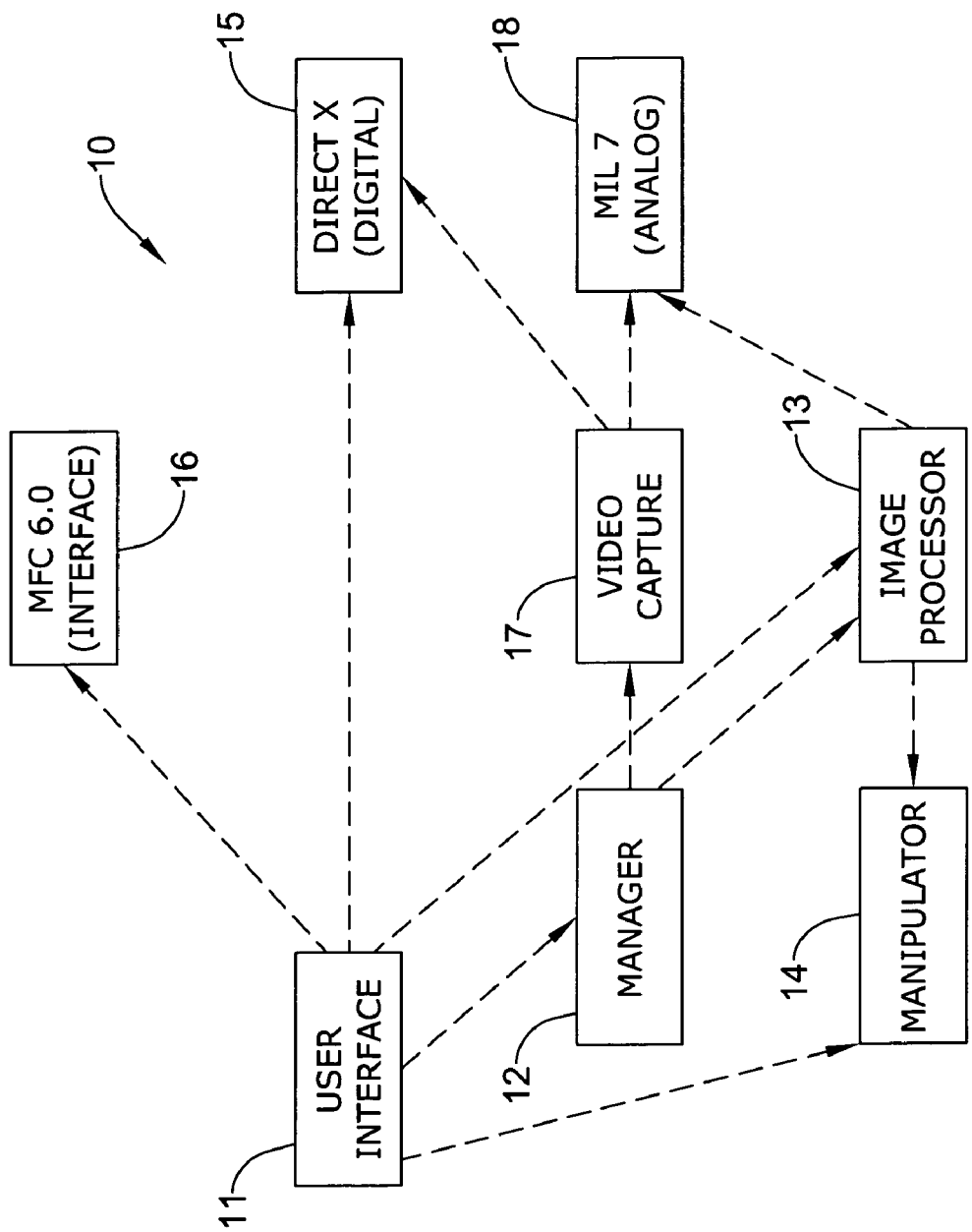
FIG. 1 is an overview of a multi-camera based tracking system.

Effective use of camera-based monitoring and surveillance systems may require continuous (i.e., temporal) tracking of objects across networks of cameras with overlapping and/or non-overlapping fields-of-view (FOVs). Practical reasons for deploying these systems, especially those used for object tracking in large areas, may limit the number of cameras to be deployed. Furthermore, in order to maximize the coverage area of useful tracking, the cameras may be positioned with non-overlapping FOVs. Additionally, strict security requirements favor surveillance systems that may have the location of the object being tracked (e.g., a person at an airport) at all times. The present system may relate to the issue of continuous object tracking across a network of cameras with or without overlapping fields-of-view.

The present system may incorporate a Bayesian methodology regarded as some sort of sequential Monte-Carlo (SMC) approach. An SMC approach may provide a solution to the problem of image-based tracking through statistical sampling. As a result, this tracking approach may cope with scenarios in which object tracking lasts for as long as the object remains in the FOV of a camera, stops while it is outside of the FOV, and automatically resumes when the object reappears in the camera's FOV. The present system may use a combination of both color and shape information of the object to be tracked.

Tracking across two or more cameras may be achieved according to the following. Tracking may be initiated within a first camera manually or via a user input or automatically which last while the object being tracked is within the first camera's FOV. Object information may be simultaneously communicated to other cameras which are in the topological proximity of the first camera. Tracking tasks in the other cameras may be initiated and put into a mode as if the object had disappeared from the other cameras' FOVs waiting to resume tracking when the object appears again in their FOVs.

To implement and use the present system, a list of cameras may be arranged according to the potential travels or routes that people or moving objects of interest follow during their typical course of moving activity. Based on a camera arrangement, a notion of topological proximity may thus be ascribed. One or more computers may be deployed for processing camera images. Computing resources per camera may be allocated in a predefined or adaptive way. A tracking task of a moving object may be initiated by a single click with an object's silhouette. A motion detection procedure may be used to derive the color and shape representation of a moving object. If the object is not moving, a rectangle that encompasses the object of interest may be used. A thread implementing SMC tracking may begin with a camera's FOV. As the object moves towards the camera's image boundaries in a particular direction, the camera(s) which is (are) in the topological neighborhood may be conditioned to expect an arrival of the object started to be tracked. Camera conditioning may mean that another SMC tracking is spawned using a representation of the object provided by the previous tracking and so on.

The system may use a combination of color and shape for an object representation. The specific object representation may be embedded on an SMC framework for tracking. Topological arrangement of cameras covering a large area may be based on the potential routes or paths of moving objects.

Computing resources allocated to the cameras may be based on a Quality of Service (QoS) concept which is derived from the topological proximity among network cameras.

FIG. 1 shows an overview of a system 10 that implements the present invention. There may be a user interface 11 that processes inputs from an operator to various modules of the system. An output from the user interface 11 may go to a manager module 12, an image processor module 13, a manipulator module 14, a direct X module 15, and an MFC 6.0 module 16.

The user interface 11 may have inputs from a Safeskies™ user interface sub-module 21 and a Safeskies™ test user interface sub-module 22, as shown in FIG. 2.

User interface sub-module 22 may be used for quickly testing different modules of system 10. The sub-module 22 may be utilized for exposing the system's capability and by minimizing the processing overhead. The user interface sub-module 21 may be implemented when the modules are ready and debugged using a plug-in framework.

The image processor module 13 may have a background subtractor sub-module 23 and a particle filter sub-module 24 connected to it as shown in FIG. 3. This module covers particle filtering and model tracking. The background subtractor sub-module 23 may be used for moving object detection in a scene The manipulator module 14 may implement an appearance model of the object, such as color and multi-resolution histograms. FIG. 4 shows a histogram sub-module 25 which may be connected to the multi-resolution sub-module 26. Multi-resolution sub-module 26 may be connected to an object representation sub-module 27, which in turn is connected to the manipulator module 14. The histogram sub-module 25 may implement a histogram in various color spaces, such as the red, green and blue combination, HSV and so on. The multi-resolution implementation may supplement representation of objects in a scene. The object representation sub-module 27 may interface with a particle filter for a correlation of particles with a target model.

Figure 5:
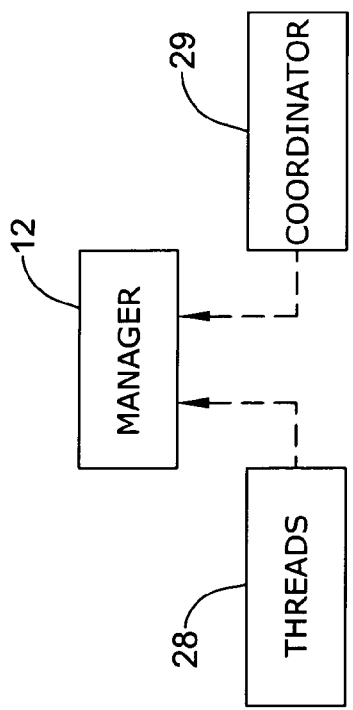
FIG. 5 is a diagram of the manager module having threads and a coordinator.
Figure 6:
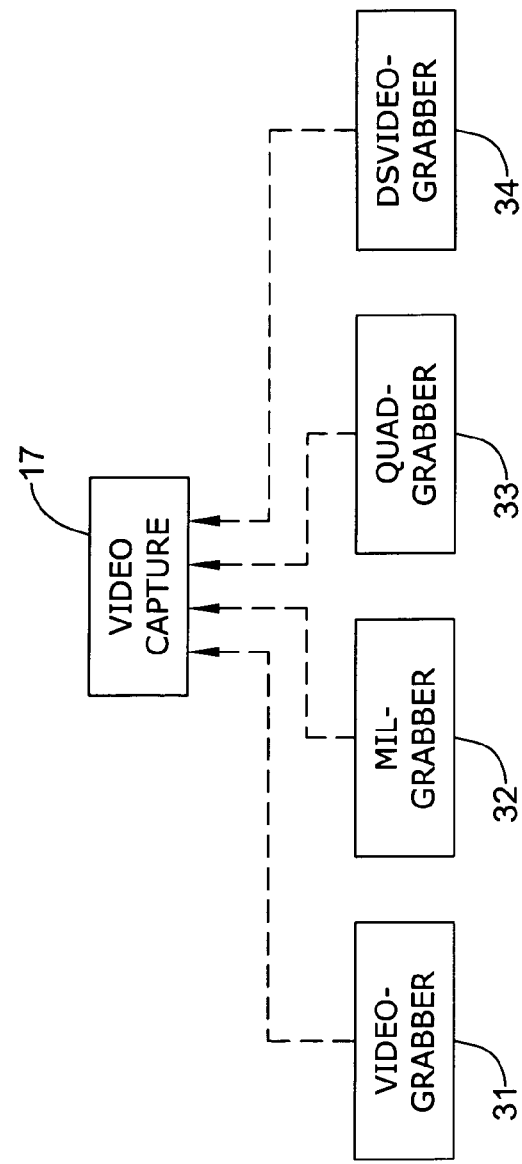
FIG. 6 shows a video capture having a plurality of grabbers.

The manager module 12 may have a threads sub-module 28 that may implement multiple threads associated with every camera node that composes the camera network, as shown in FIG. 5. There may be one thread specific to one camera. There may be one thread specific to one person for one camera and multiple threads for the same person on various cameras. There may be multiple threads for different people on one camera. A coordinator sub-module 29 may be responsible for coordinating the exchange of information between the appropriate threads. The manager module 12 may indicate which module goes next, whether it be sequentially, temporally, or otherwise.

The direct X module 15 may be an interface for connecting to digital cameras. The MFC 6.0 module 16 is for interfacing with certain Microsoft™ software.

The manager 12 module may have a connection to image processor module 13 which in turn has a connection to a MIL 7 module 18. Manager 13 may include a camera selector of a network of cameras covering a given area. These cameras might or might not have over-lapping FOVs. Module 18 is an interface enables a direct connection with cameras. Image processor module 13 is also connected to manipulator module 14.

Manager module 12 is connected to a video capture module 17. Video capture module 17 may have a video grabber sub-module 31 which facilitates grabbing of image frames for processing. It is for common camera hook-ups. Module 17 may have a Mil grabber 32 which supports the Mil system for analog cameras. Image frames may be captured either by frame grabbers (such as MIL grabbers) or digitally via a USB or fire wire connection. Additionally, the sub-modules of module 17 may facilitate processing of video clips or composite image frames such as quad video coming from four cameras. A DS video grabber sub-module 34 may be a part of module 17. Sub-module 34 may be a direct show connection for a digital interface, in that it will permit the capturing of images from digital media. There may be a quad grabber sub-module 33.

Figure 7:
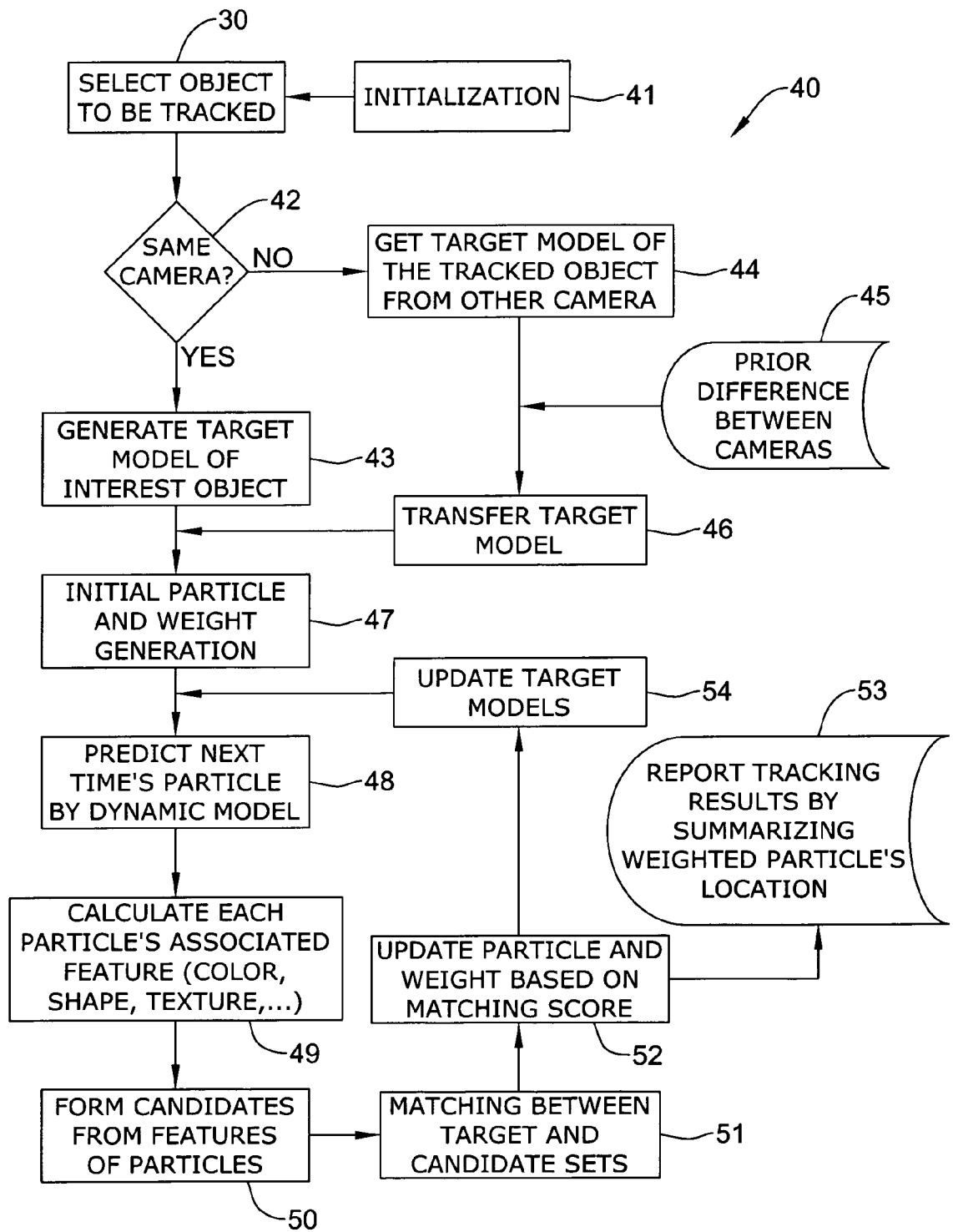
FIG. 7 is a flow diagram for tracking an object (e.g., target model) in another or same camera field-of-view.

FIG. 7 is a flow diagram 40 of the approach used by system 10 for tracking a person and finding that person in another or same camera field of view. The system may be initialized at point 41 and an object of interest to be tracked may be selected at item 30. A decision 42 may be made as to whether the same camera, provided that the object has been a subject of tracking before this juncture, or the initial camera is to be used. If so, then the target model of interest object may be generated at point 43. If not, then the target model of the tracked object may be obtained from the initially used camera at point 44. A prior noted difference between the initial camera and another camera may be incorporated from information 45 for compensation purposes of the other camera. The target model at point 46 may be transferred to the main stream particle or frame processing after camera compensation. At point 47, either the generated target model from point 43 or the transferred target model may enter the processing stream for initial particle and weight generation. The next time's particle may be predicted at point 48. At point 49, the calculation of each particle's associated feature such as color, shape, texture, and so forth, may occur. After the calculation, candidates may be formed from the features of the particles at point 50. Then a matching between the target and candidate sets may occur at point 51. The match score may be used to update the particle and weight at point 52. This updated information may be reported for recording or storage at point 53. Here, the weighted particle's location may be summarized as tracking results which are reported. The update particle and weight information may go from point 52 to point 54 where the target models may be updated. The updated target model data may enter the processing stream at point 48 where the next time's particle is predicted by the dynamic model. The process may continue reiteratively through points 49-54.

The tracking algorithm of the present system 10 may use histograms. One feature representation of the object may be a color histogram of the object. The color histogram may be computed effectively and achiever significant image data reduction. These histograms, however, may provide low level semantic image information. To further improve tracking capabilities of an object or target, a multi-resolution histogram may be added to obtain texture and shape information of the object. The multi-resolution histogram may be a composite histogram of an image patch (or particle) at multiple resolutions. For example, to compute a multi-resolution histogram of an image patch, a multi-resolution decomposition of the image patch may be first obtained. Image resolution may be decreased with Gaussian filtering. The image patch at each resolution k may give a different histogram $h_k$. A multi-resolution histogram H may then be constructed by concatenating the intensity histograms at different resolutions $H=[h_0, h_1, h_2, \ldots h_{j-1}]$.

Multi-resolution histograms may add robustness for tracking an object relative to noise, rotation, intensity, resolution and scale. These properties may make the system a very powerful representation tool for modeling the appearance of people when considered in tracking.

Figure 8:
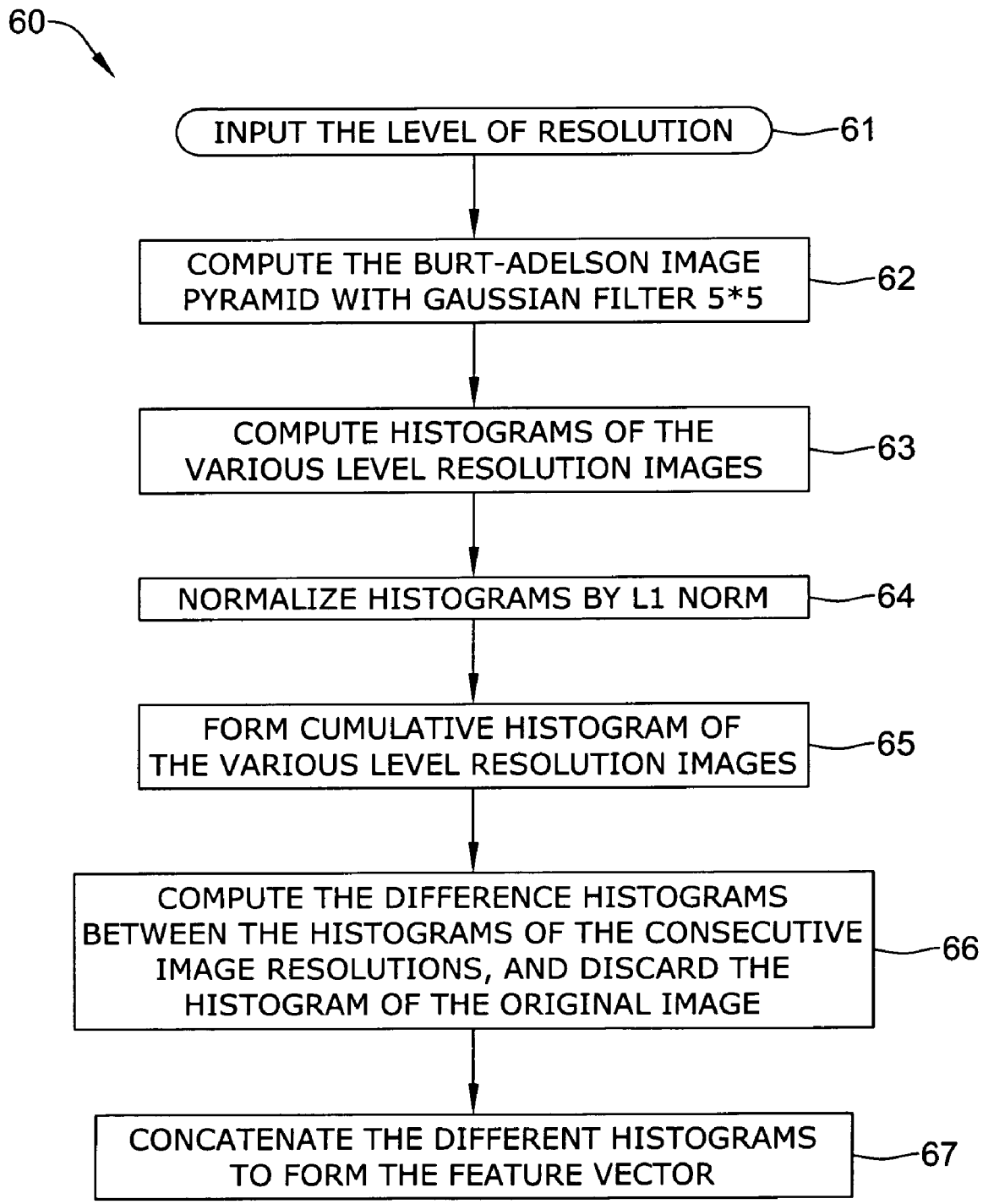
FIG. 8 is a flow diagram for computing a feature vector.

FIG. 8 shows a flow chart 60 usable for computing a multi-resolution histogram feature vector. At point 61, a level of resolution may be entered at an input of the system. Then the Burt-Adelson Image Pyramid with a Gaussian filter 5*5, at point 62. At point 63, histograms may be computed for all of the designated levels of resolution of the images of the object. These histograms may be normalized by an L1 norm at point 64. A cumulative histogram may be formed of all of the level resolution images of the object at point 65. At the next point 66, difference histograms may be computed between the histograms of consecutive image resolutions. The histogram of the original image may be discarded. Then the difference histograms may be concatenated to form the feature vector at point 67.

One may note the performance of multi-resolution histograms of a person's body parts, (i.e., upper and lower body and head). The same person viewed by a camera at different positions, orientations, scales and illuminations is shown in FIGS. 9-12. A comparison of the multi-resolution histograms or feature vectors is shown in FIG. 13).

From a theoretical point of view, the difference histograms may relate to the generalized Fisher information measures, as described in the following formulas.

$$J_q(I) = \frac{\sigma^2}{2} \sum_{j=0}^{m-1} \left( \frac{v_j - v_j^q}{q-1} \right) \frac{dh_j(I*G(1))}{dl}$$

where I is the intensity image, I(x) is the intensity value at pixel x; G(I) is Gaussian filter, I is the resolution, I*G(l) means filtered image;

$$\frac{dh_j(I*G(l))}{dl}$$

is the difference histogram between consecutive image resolutions; $v_j$ is the value of histogram density j, and $J_q(I)$ is the generalized Fisher information, which is proportional to the difference histogram.

Figure 9:
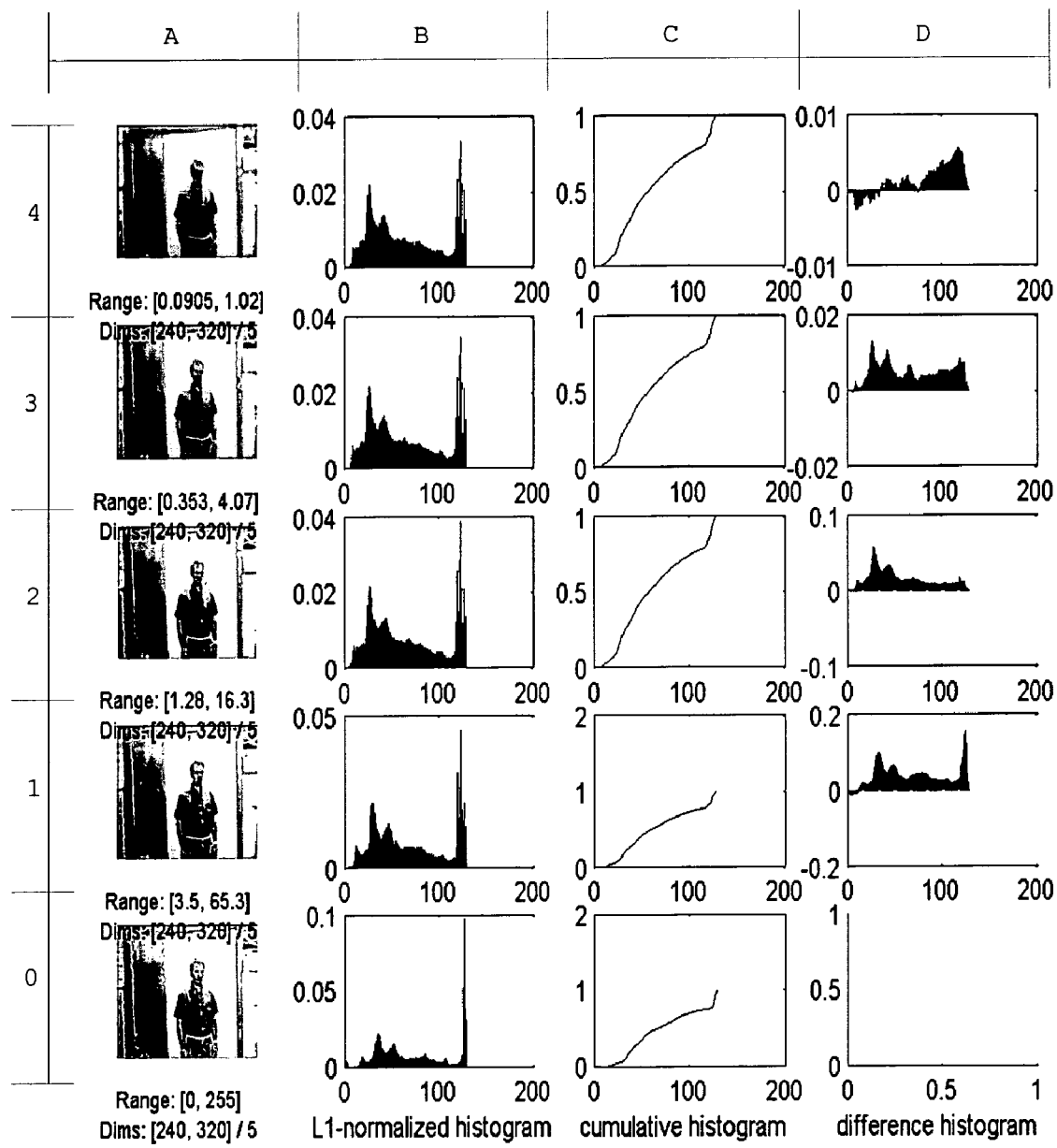
FIGS. 9, 10, 11 and 12 show a feature representation for different images of the same person.

FIG. 9 shows a detail feature representation for a first image. Column A shows a multi-resolution decomposition by the Burt-Adelson image pyramid, with level 0~4 level. Histograms of the multi-resolution images for each level are shown in column B. Column C reveals cumulative histograms of the multi-resolution images for each level. Difference histograms of the consecutive multi-resolution levels are revealed in column D. The difference histogram shows the transformation of the rate at which the histogram changes with image resolution into the generalized Fisher information measures. One may see that the difference histogram also shows that the generalized information measures link at the rate at which the histogram changes with image resolution to properties of shapes and textures.

Figure 10:
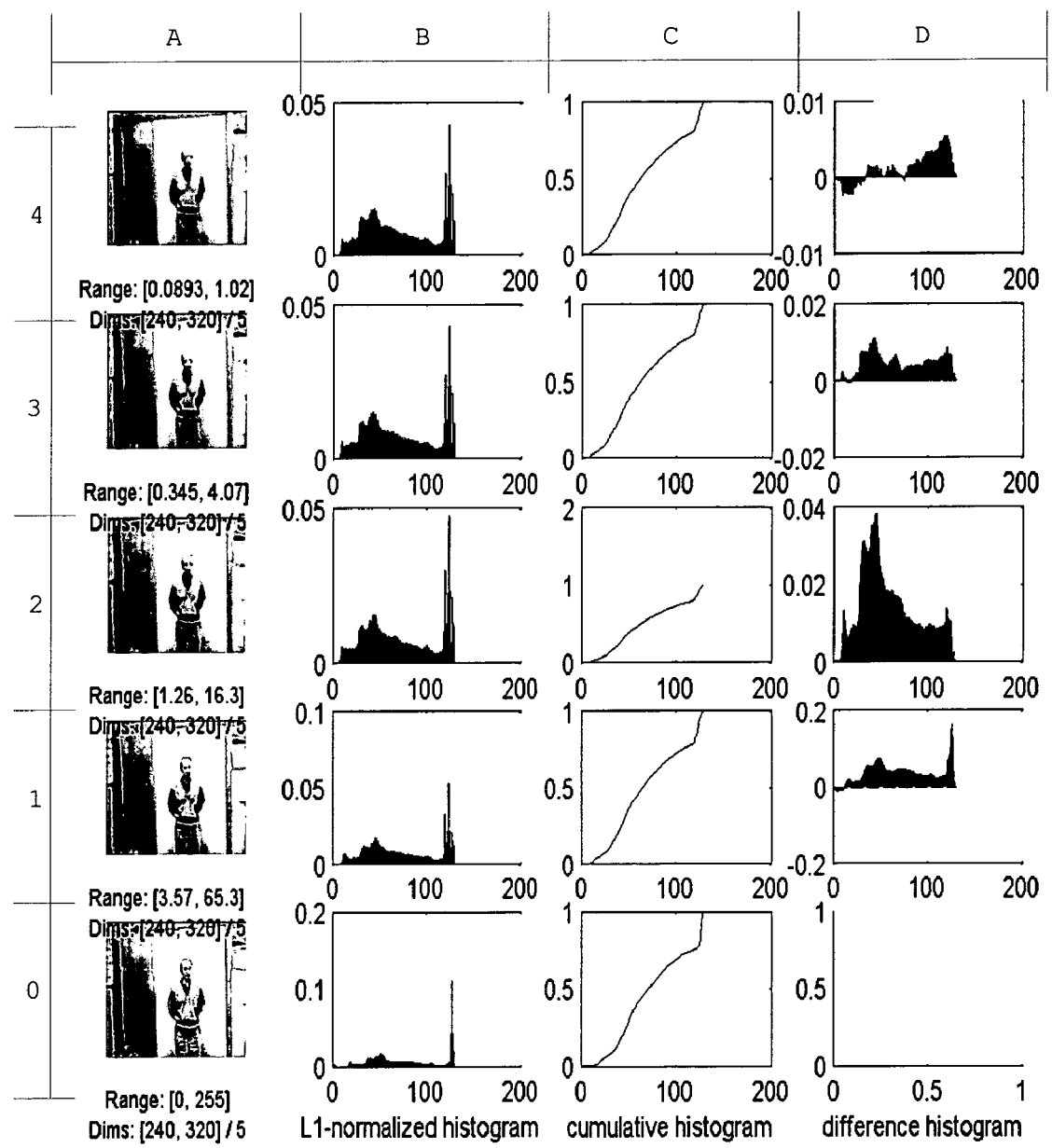

FIG. 10 shows a detail feature representation for a second image of the same person as in the first image but with a different pose and illumination. Column A shows a multi-resolution decomposition by the Burt-Adelson image pyramid with level 0~level 4. Column B reveals a histogram of the multi-resolution images for each level. Cumulative histograms of the multi-resolution images for each level are shown in column C. Column D reveals the difference histograms of the consecutive multi-resolution levels.

Figure 11:
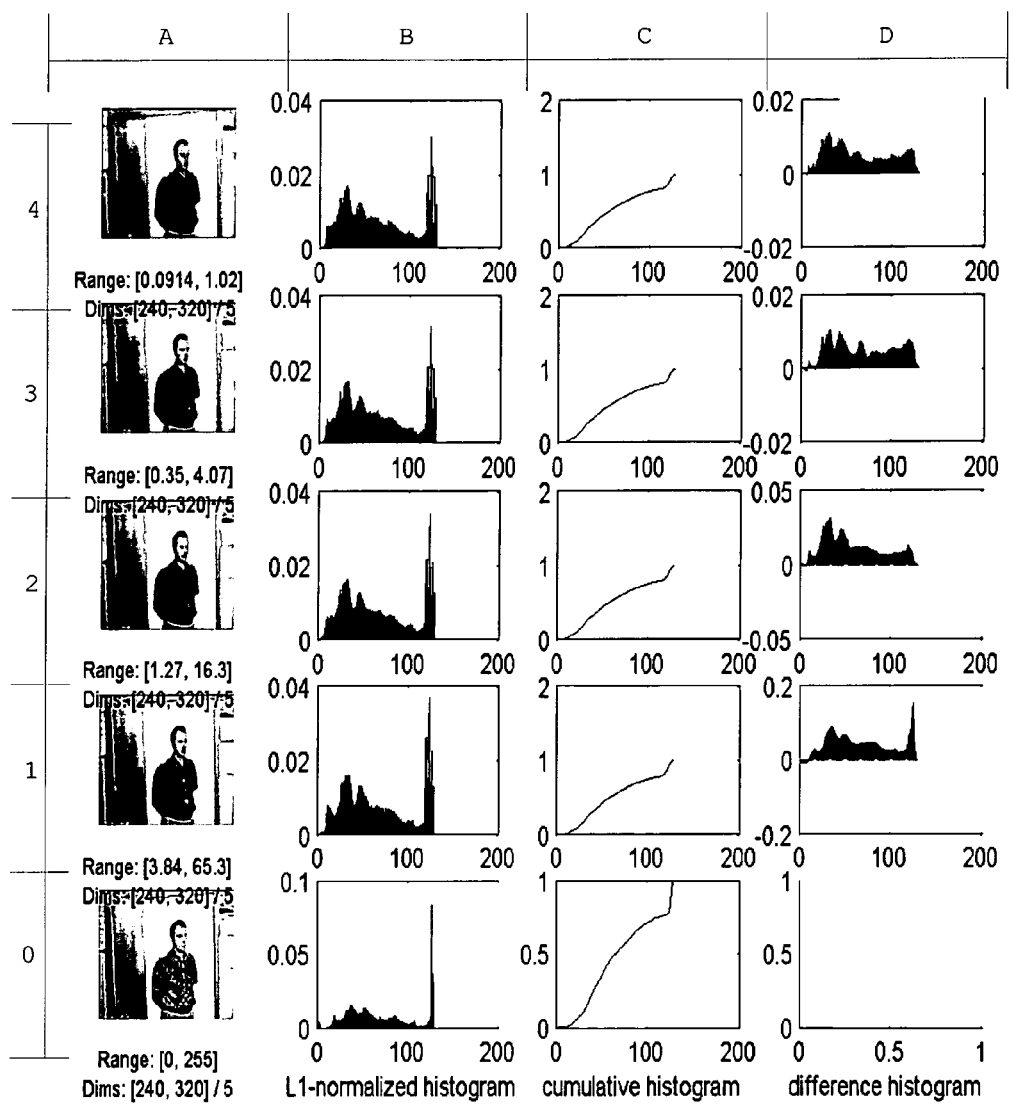

FIG. 11 shows a detail feature representation for a third image of the same person in the first and second images, but with a different pose and illumination. Column A shows a multi-resolution decomposition by the Burt-Adelson image pyramid with level 0~level 4. Column B reveals a histogram of the multi-resolution images for each level. Cumulative histograms of the multi-resolution images for each level are shown in Column C. Column D reveals the difference histograms of the consecutive multi-resolution levels.

Figure 12:
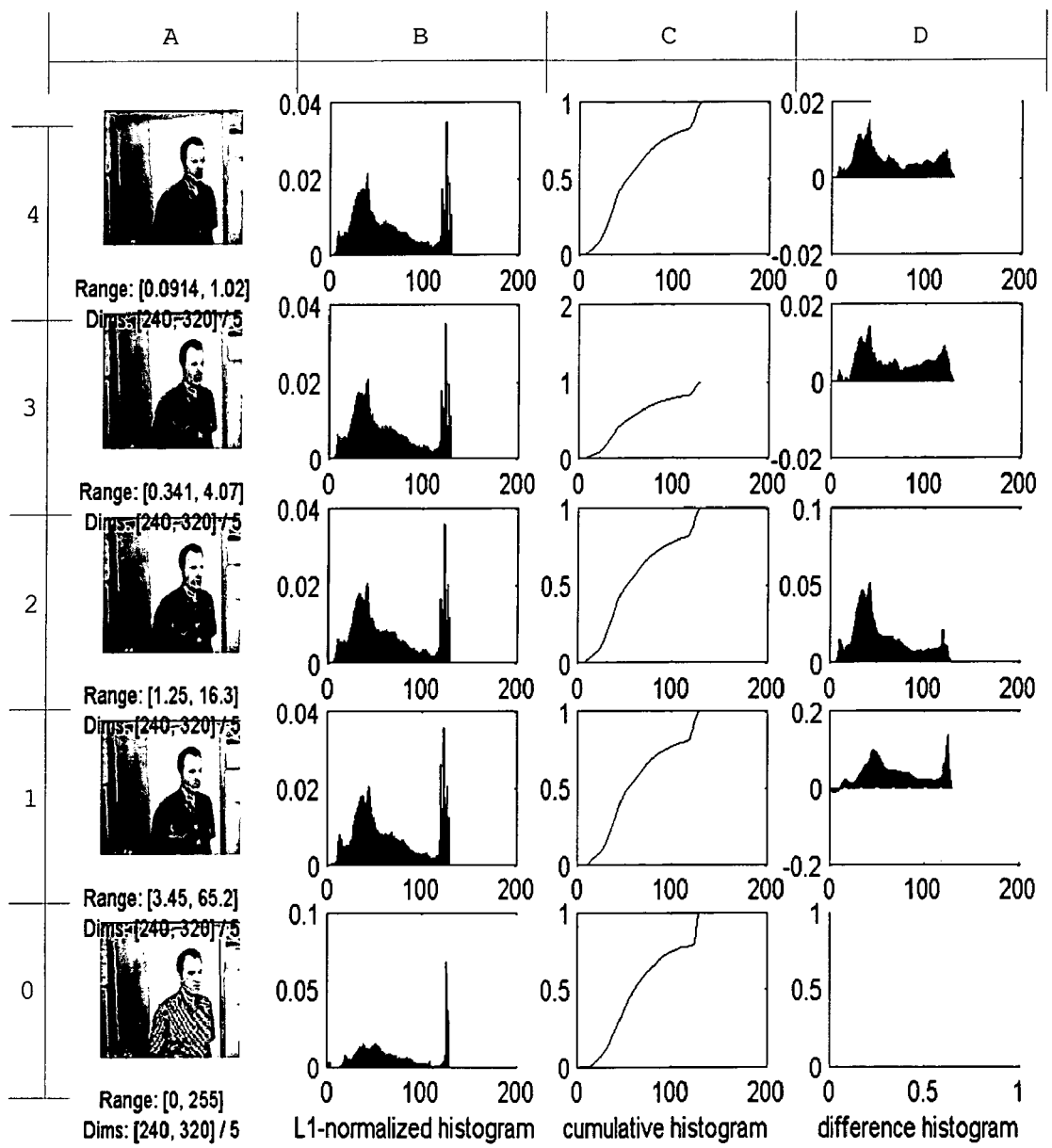
Figure 13:
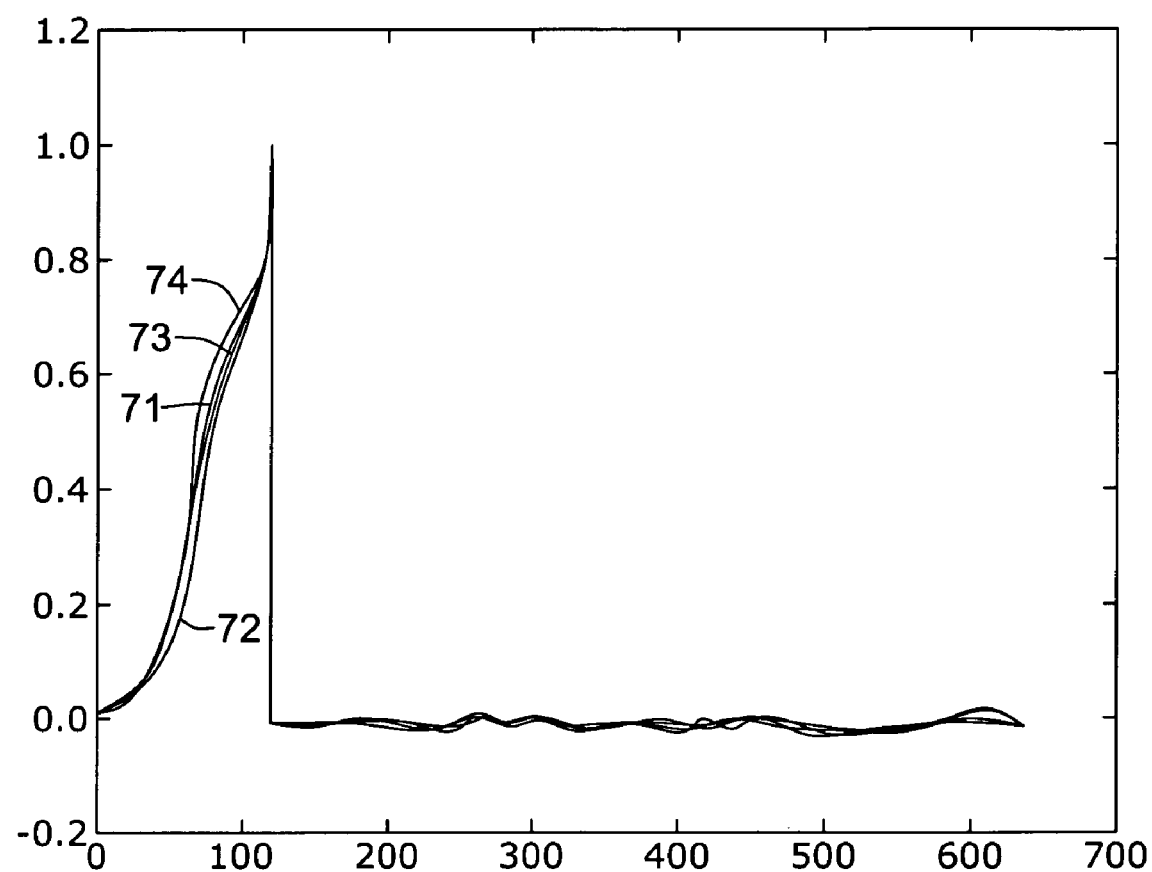
FIG. 13 shows multi-resolution representative curves for the images of FIGS. 9-12.

FIG. 12 shows a detail feature representation for a fourth image of the same person in the first, second and third images but with a different pose and illumination. Column A shows a multi-resolution decomposition by the Burt-Adelson image pyramid with level 0~level 4. Column B reveals a histogram of the multi-resolution images for each level. Cumulative histograms of the multi-resolution images for each level are shown in column C. Column D reveals the difference histograms of consecutive multi-resolution levels.

FIGS. 9-12 show the multi-resolution histogram representation for the same person under a different pose, scale and illumination. The concatenate difference histogram is shown in FIG. 13. This figure reveals that the four curves for the four images to be so similar as to be identifying the same person. Curves 71, 72, 73 and 74 are multi-resolution representations of the first, second, third and fourth images, respectively.

One may continue to build on the representation methodology by discussing the matching process for determining the similarity and ultimately the match between two different object representations. Two steps in particle filter tracking may be, first, a prediction step (that predicts the change of state of the target, i.e., position and size of the target object); and, second, a measurement step, i.e., image measurements that facilitate the process of building confidence about the prediction regarding the target at hand. The object representation and related matching algorithm are essential items of the measurement approach.

A matching algorithm may first use color information to form object representations. An object representation may be a weighted histogram built using the following formula.

$$q_u = C\Sigma_i f(\delta[b(x_i)-u]) \qquad (1)$$

The candidate object representation may be given by a similar weighted color histogram as shown in the following formula.

$$p_u(s_t^{(n)}) = C\Sigma_i f(\delta[b(x_i)-u]) \qquad (2)$$

In target representation (1) and candidate object representation (2), C is normalization factor, and f(·) may be a kernel function to weight more on the center of the region. Then the matching algorithm may use the following distance function which is given by the following Bhattacharyya coefficient (3).

$$m(p_u(S_t^{(n)}), q_u) \qquad (3)$$

The smaller the distance between the target model and candidate region, the more similar the regions are. The relationship of the matching distance function in the measurement step in the particle filtering tracking algorithm may be given by the following formula (4), $$\pi_t^{(n)} = p(Z_t|x_t = s_t^{(n)}) = m(p_u(S_t^{(n)}), q_u) \qquad (4),$$

where the weighted sample set $$(S_t^{(n)}, \pi_t^{(n)}), n=1, \ldots, N$$

Figure 14:
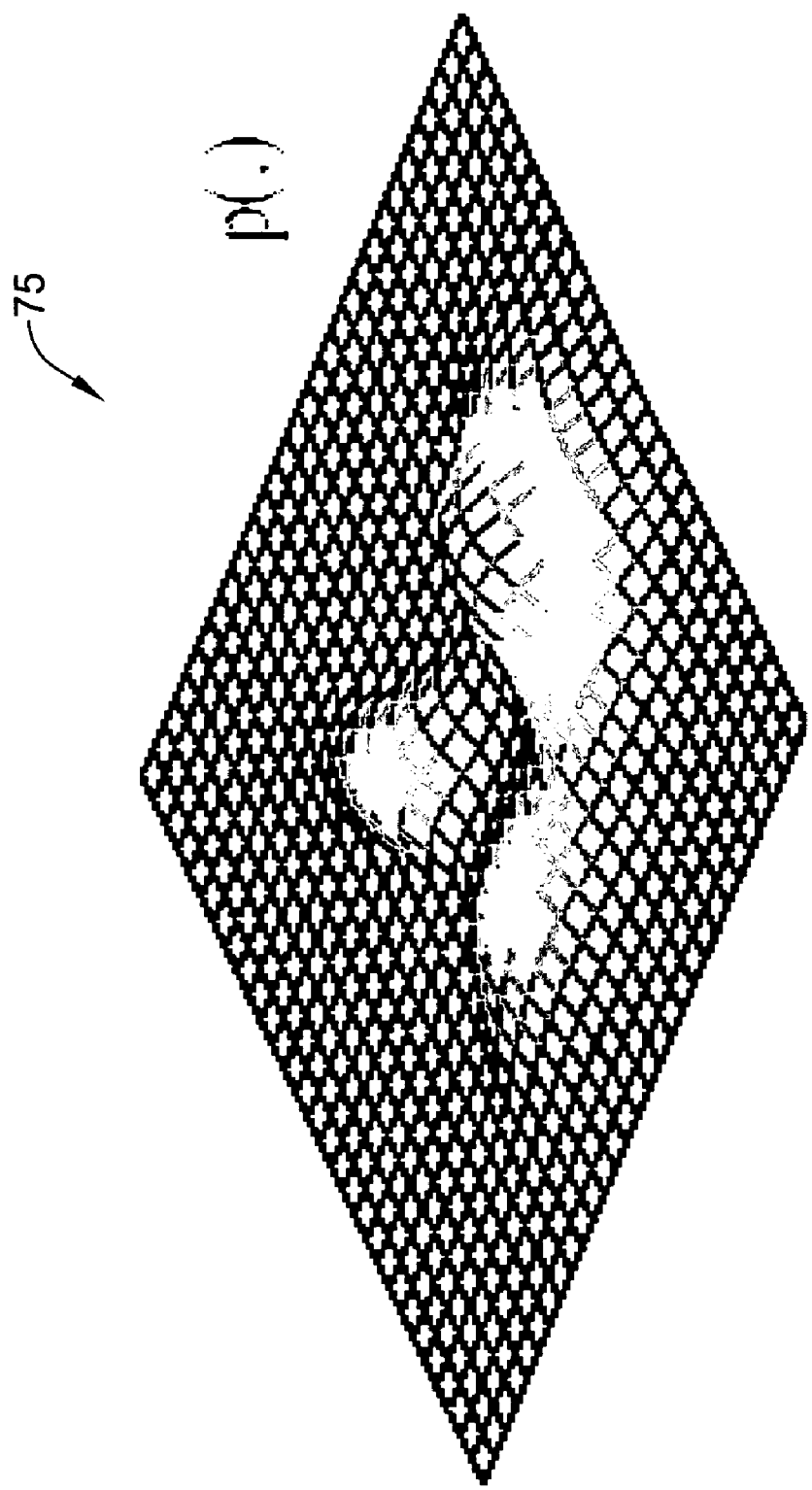
FIG. 14 is a graph of a two-dimensional probability density function of a tracked object in pixel coordinate space.

N represents the number of particles used for tracking. Particles may be used to approximate the probability distribution of the target state that the tracking algorithm predicts. A visualization of the respective probability density function is shown in FIG. 14. FIG. 14 shows a two-dimensional probability density function "p(.)" 75 of a tracked object in pixel coordinate space.

For target representation, one may use a multi-resolution histogram rather than the scheme described in formulae (1) and (2) above. A multi-resolution histogram may include color, shape and texture information in one compact form.

Figure 15B:
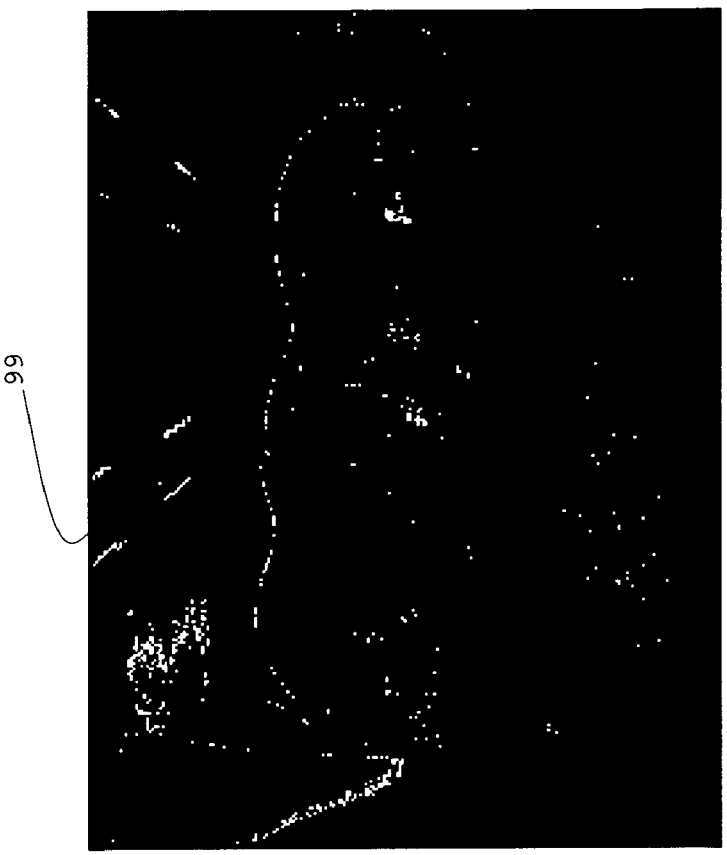
FIGS. 15a and 15b show an example of background subtraction of a static scene.
Figure 15A:
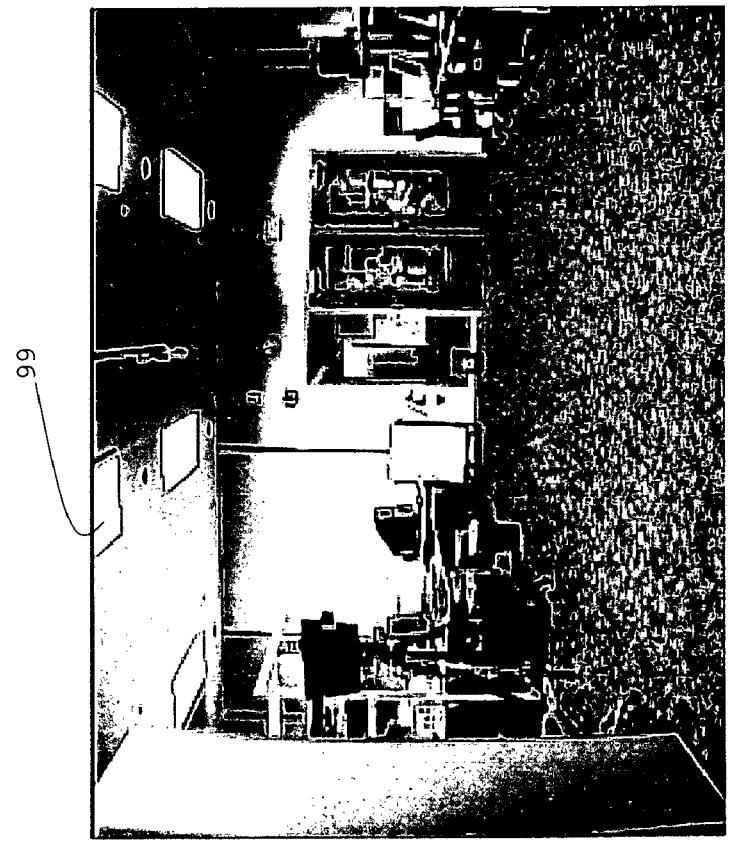
Figure 16A:
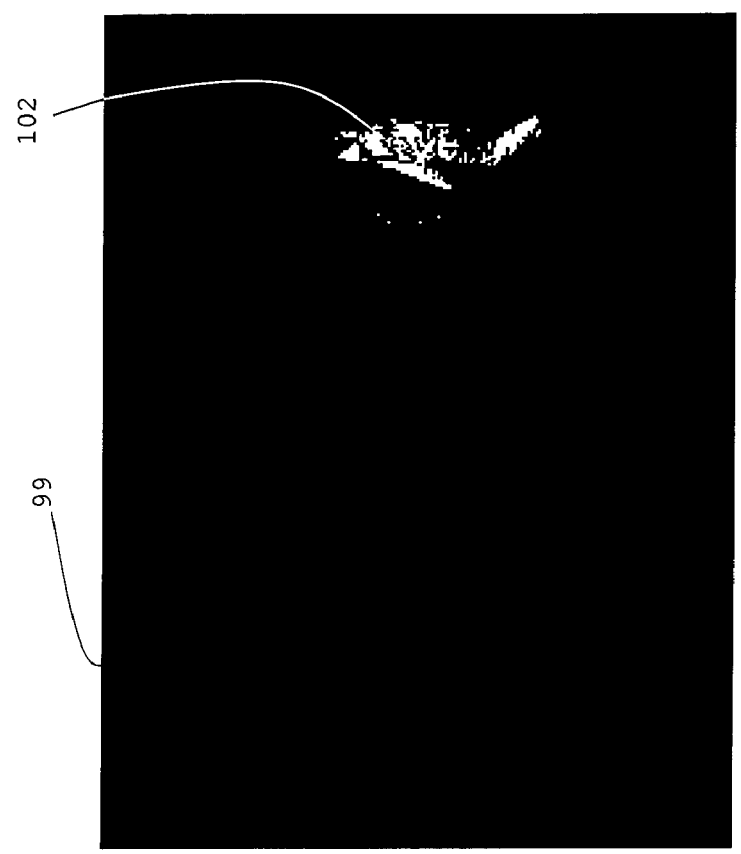
FIGS. 16a and 16b show an example of background subtraction of a scene involving a non-static object.
Figure 16B:
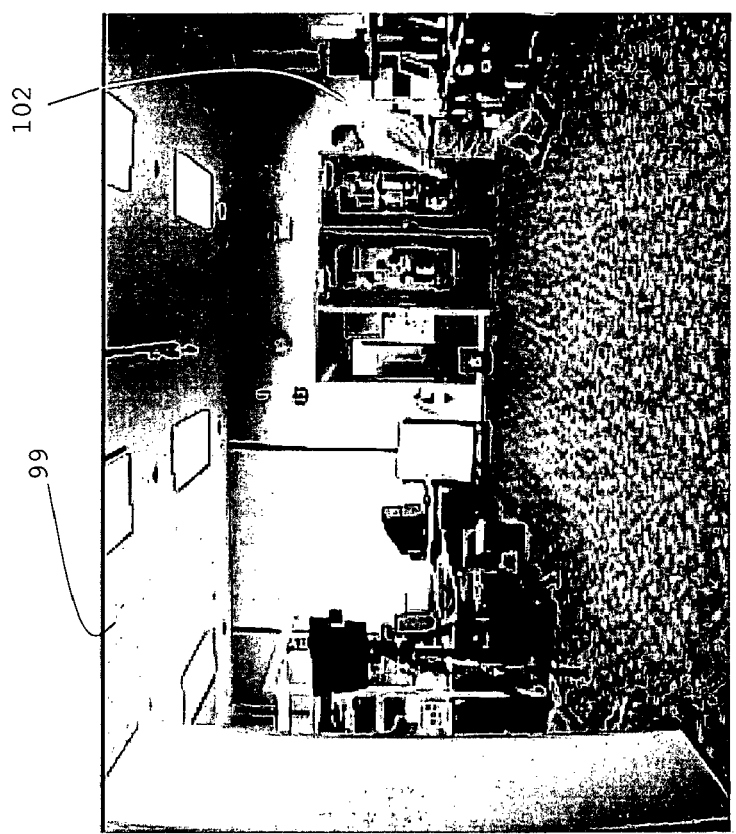

Background subtraction may be shown in FIGS. 15a, 15b, 16a and 16b. FIG. 15a shows a background 99 of a laboratory scene. FIG. 15b reveals a background learning of static scene of the laboratory background 99. FIG. 16a shows a non-static person 102 in the laboratory scene. FIG. 16b distinguishes the non-static person 102 from the background 99. It amounts to moving object 102 detection via background 99 subtraction.

Figure 17:
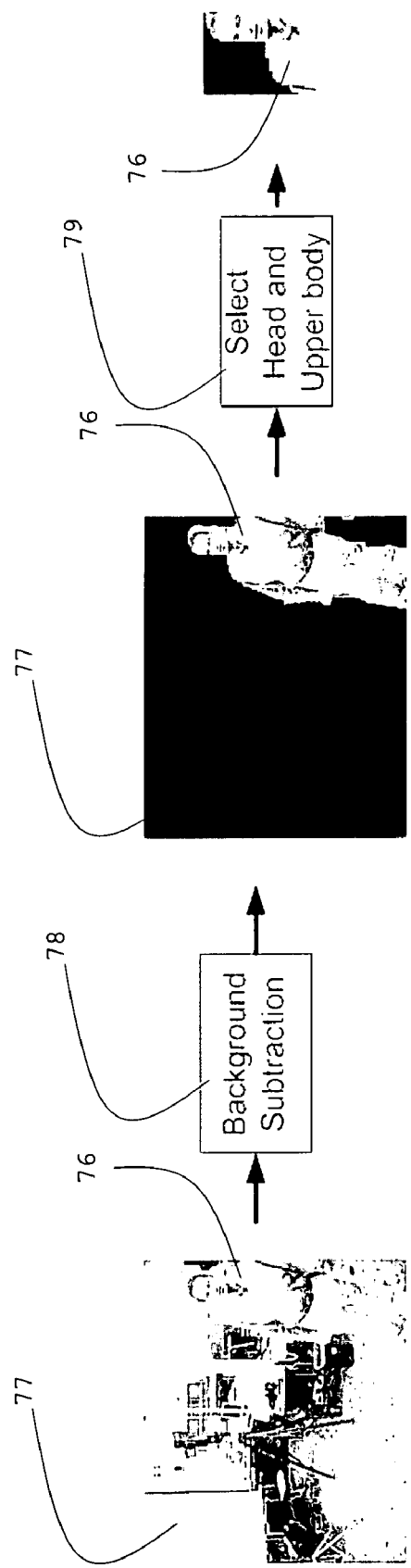
FIG. 17 shows a subtraction technique for separating a foreground region from a background of a scene.

FIG. 17 shows an approach where a background subtraction technique may be applied to separate the foreground region 76 (i.e., the person) from the background 77 before a multi-resolution histogram is applied. By performing a foreground/background subtraction 78 and a head and upper body selection 79 first, a more robust representation of a person may be assured because the effect of the background which is considered noise is minimized. The effect of background subtraction 78 on the target object 76 representation is shown in FIGS. 18a and 18b. These figures reveal an effect of background subtraction 78 on the target object 76 representation. FIG. 16a shows a plain color histogram 81 of the whole image with the background 77 and FIG. 18b shows a masked color histogram 82 with the background subtracted out of the image. One may note that histogram 82 of only the foreground target object or person 76 appears to be better distributed than histogram 81 where the background 77 is included. Background 77 appears as another mode 83 in the first bin of histogram 81 in FIG. 18a.

Figure 19:
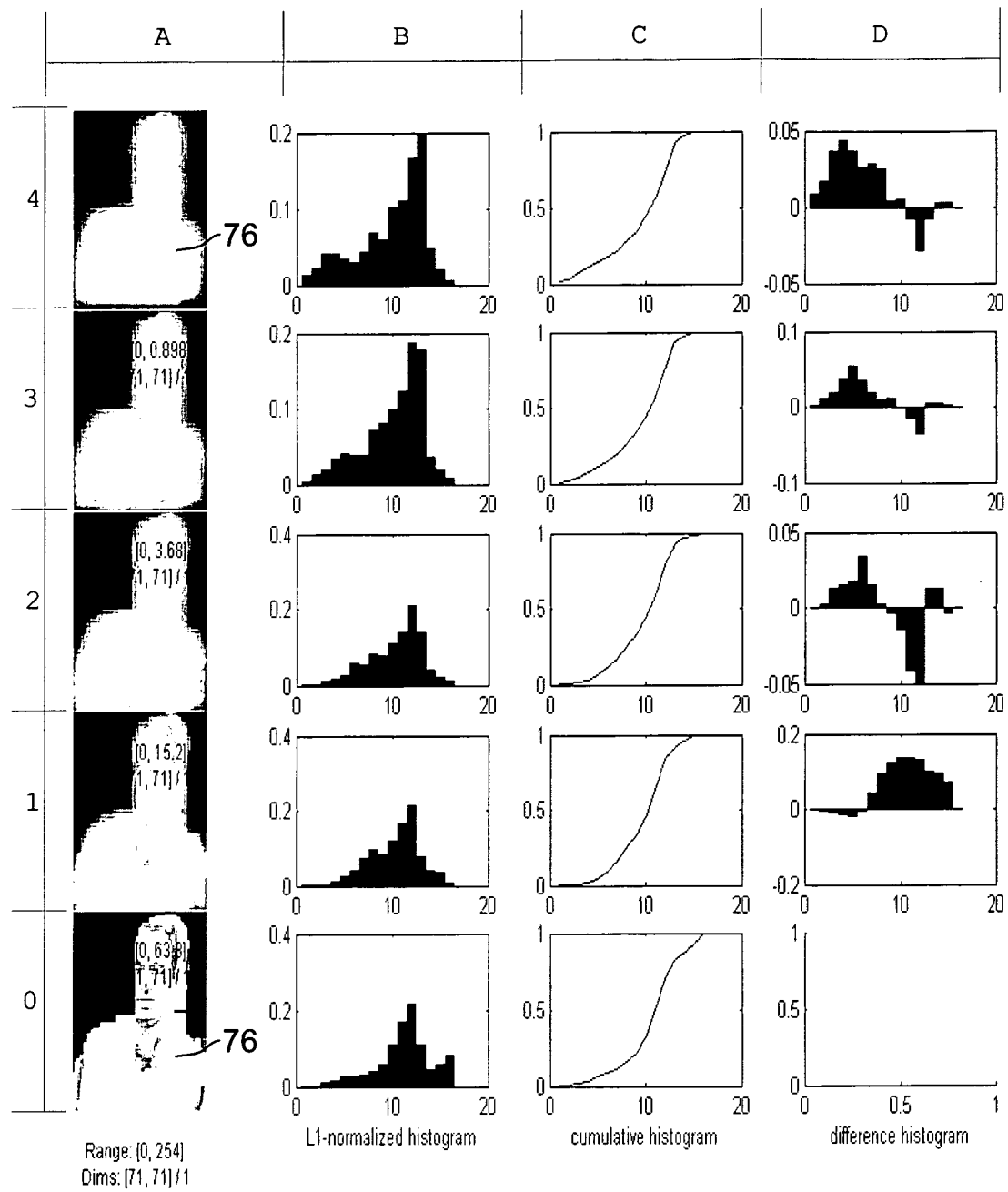
FIG. 19 shows a multi-resolution histogram of a target object.

FIG. 19 shows a multi-resolution histogram of the target object 76. Column A shows a multi-resolution decomposition by the Burt-Adelson image pyramid with level 0~level 4. Column B reveals a histogram of the multi-resolution images for each level. Cumulative histograms of the multi-resolution images for each level are shown in column C. Column D reveals the difference histograms of consecutive multi-resolution levels. The multi-resolution histogram shown may be performed on the person 76 that was separated from the background 77. The cumulative histogram of column C may be used here. For instance, one may want to compare example histogram as follows, hA=(1; 0; 0), hB=(0; 1; 0), and hC=(0; 0; 1). Histogram hA may be more similar to histogram hB, than histogram hA is to histogram hC. The L1 distance, however, between hA and hB is the same as the L1 distance between hA, and hC. That is, $|hA-hB|1 = |hA-hC|1.$ Therefore, the histograms in their original form do not necessarily represent the fact that hA is more similar to hB than hA is to hC. The corresponding cumulative histograms are hcum_A=(1; 1; 1), hcum_B=(0; 1; 1), and hcum_C=(0; 0; 1). The distances between the cumulative histograms satisfy:

$|h_{cum\_A} - h_{cum\_B}|1 < |h_{cum\_A} - h_{cum\_c}|1$ as one may expect.

Figure 20:
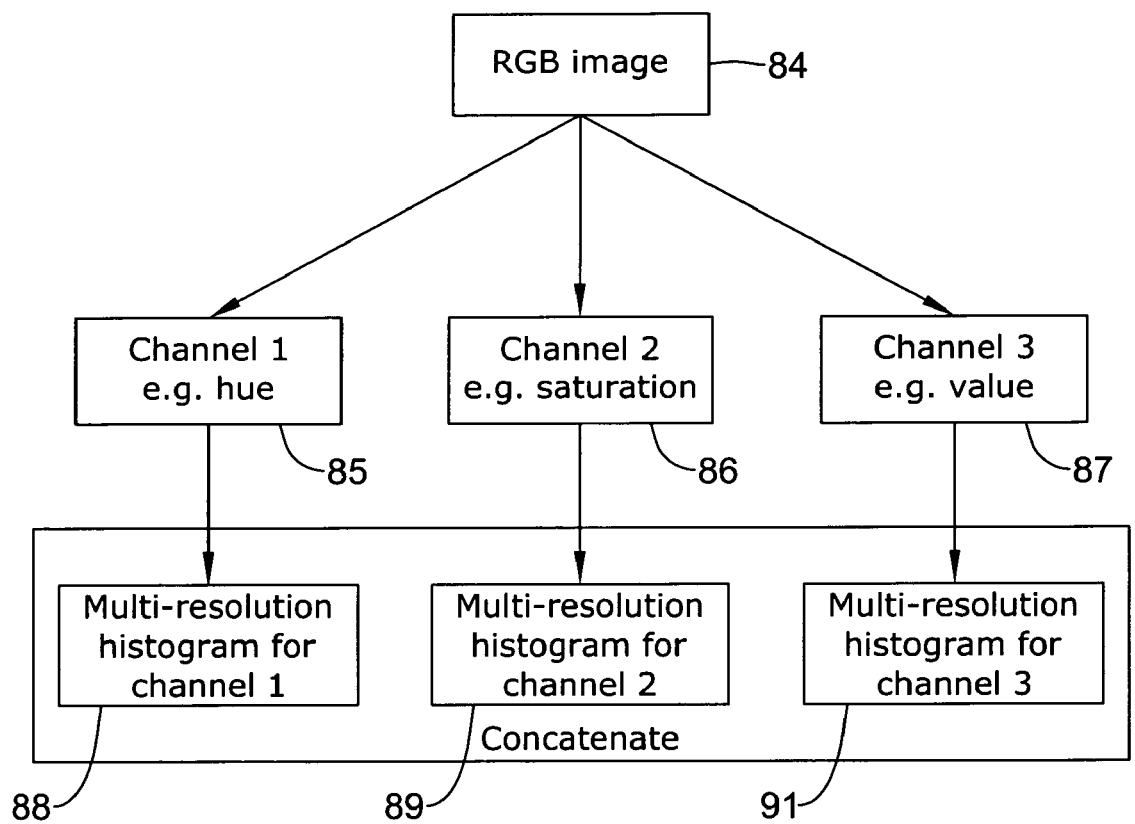
FIG. 20 shows a flow diagram for a multiple-channel, multi-resolution histogram.

FIG. 20 shows a flow diagram for developing a 3 channel (HSV) multi-resolution histogram for color space. From an RGB image 84, one channel 85 may be for hue, a second channel 86 for saturation, and a third channel 87 for value, as examples. Multi-resolution histograms 88, 89 and 91 may be made for channels 85, 86 and 87. These histograms may be linked or concatenated.

Figure 21:
FIG. 21 shows an image of a person being tracked among another person.
Figure 22:
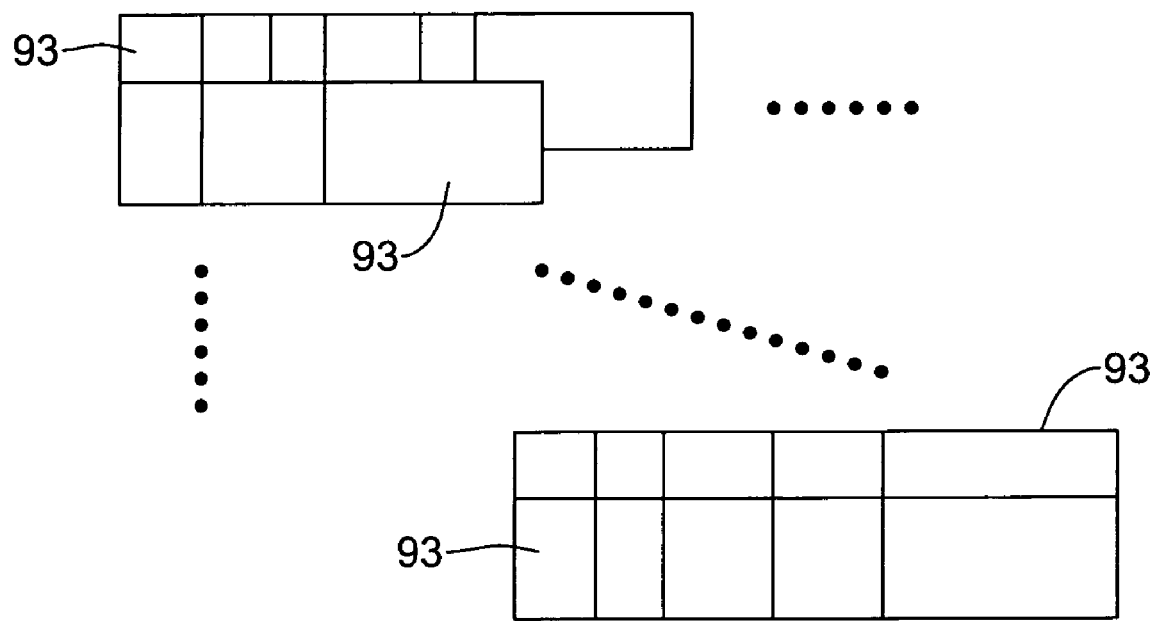
FIG. 22 illustrates a particle filtering process using sub-windows.

Matching image regions may be important during tracking (although matching is not equivalent to tracking). In a particle filter framework, the matching performance may greatly affect the measurement step. FIG. 21 shows an image of the person 76 being tracked appearing at a different pose, position and orientation than the pose, position and orientation of the person 76 when being initially tracked. Additionally, another person 92 is present in image picture of FIG. 21. The particle filtering process may be emulated by examining the image at fixed size sub-windows 93 thereby sweeping the whole image for the presence of the appropriate target 76, in FIG. 22. The original representation of the target 76 was performed on an image different from the one of appearing in FIG. 21.

Figure 23:
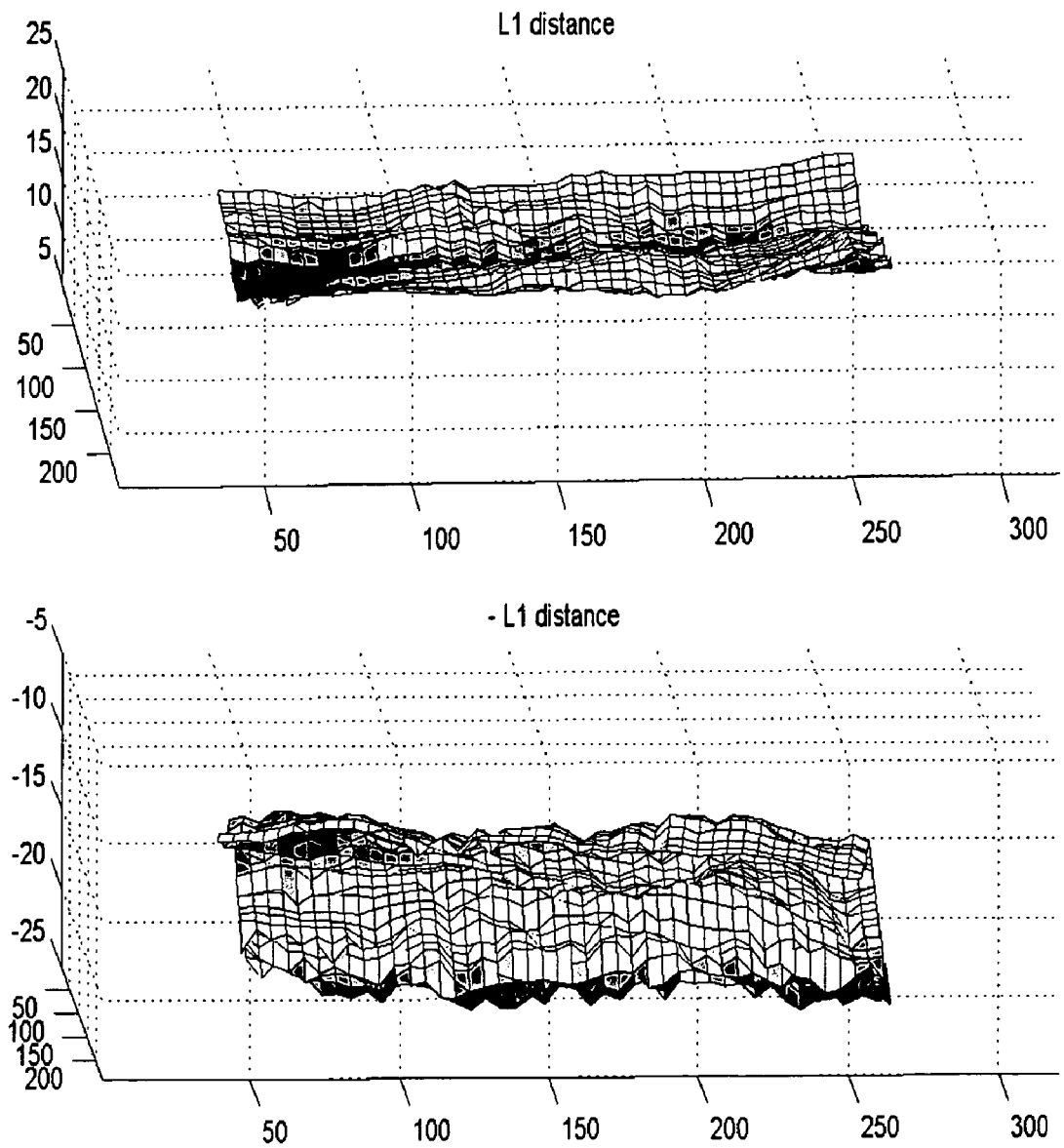
FIG. 23 shows graphs of a score for various sub-windows in FIG. 22 of the image in FIG. 21.
Figure 24A:
FIGS. 24a and 24b reveal subtraction of background for a selected image patch.
Figure 24B:
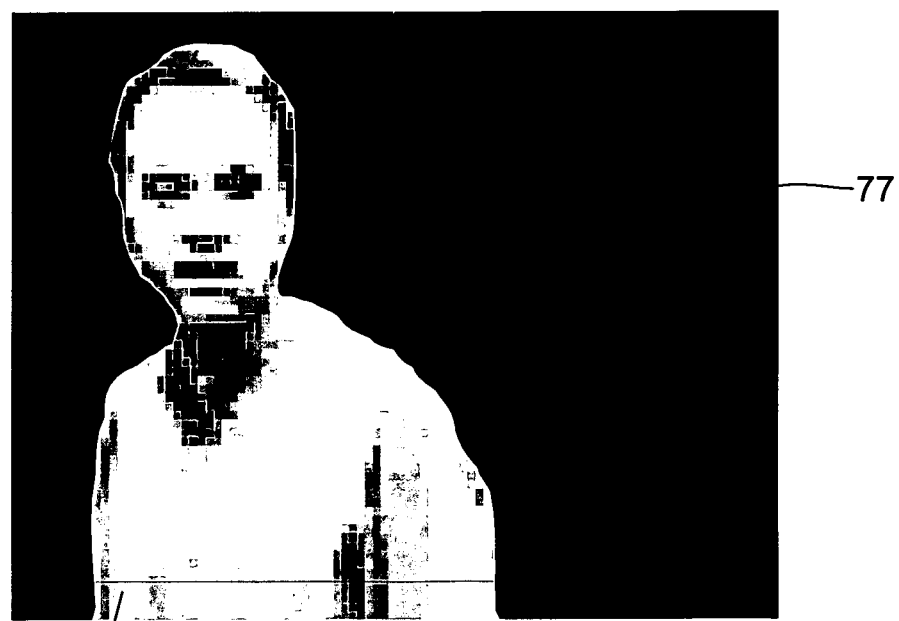

FIG. 23 shows a matching score for the various sub-windows 93 of the image appearing in FIG. 21. Without any background subtraction the selected person or target 76 (the sub-window 93 with the smallest distance) is shown as an image patch in FIG. 24a. It may be noted that even under a fixed sub-window, the matching algorithm reveals good performance. However, when background 77 subtraction is added, and the same steps are followed for the selected image patch shown in FIG. 24b, superior performance may be verified.

Figure 25:
FIG. 25 reveals a series of image frames at a location for tracking an object or objects.
Figure 28:
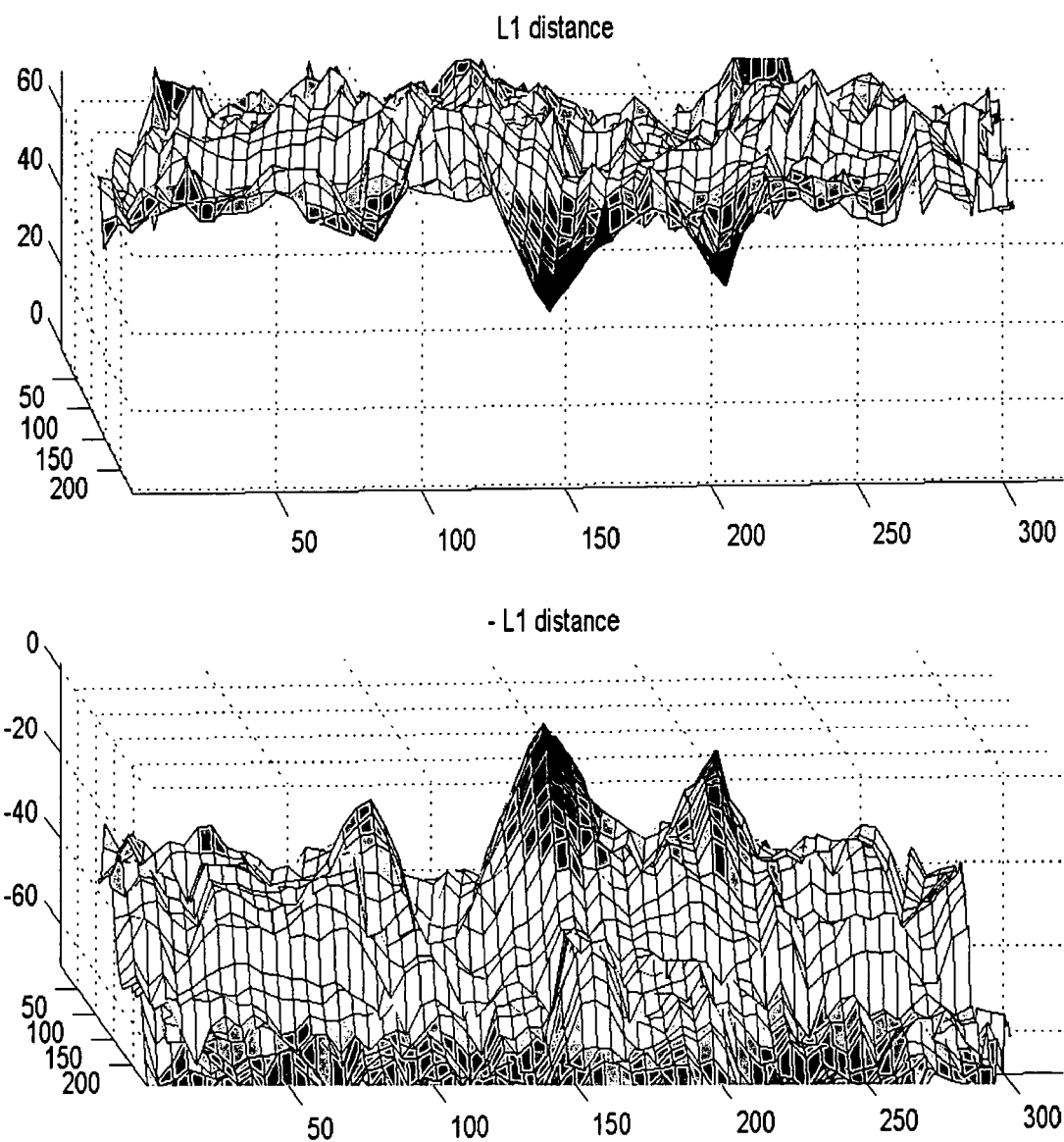

FIG. 25 shows a sequence of 25 consecutive frames taken at an airport. Here, one may note an example of using multi-resolution histograms for people tracking with a video sequence from the airport. Frames 80 and 90 may be of particular interest. There may be a temporary gap between image from 80 and image frame 90, also shown in FIGS. 26a and 27a, respectively. In frame 90, there is a person 94 shown in the upper left corner of frame 90, who does not appear shown in frame 80. So there may be a degree of difficulty introduced in matching a cropped target patch 95 and candidate patches along with a change in illumination. By matching the multi-resolution histogram of the target on candidate regions in the image frame 90, an image patch 96 is a selected region as having a similar or matching histogram. Target patch 95 of frame 80 and selected image patch 96 of frame 90 are shown in FIGS. 26b and 27b, respectively. FIG. 28 shows a matching score on the same size sub-window on the image frame 90. It may be noted that for the selected image patch 96 in FIG. 27b, it gives the smallest L1 distance when compared with the original target image patch 95 of FIG. 26b, as shown in FIG. 28 which shows a nearly matching score on the same size sub-windows of frame 90.

Figure 29A:
FIGS. 29a, 29b, 30a and 30b show image examples for evaluation of a multi-resolution histogram.
Figure 30A:
Figure 29B:
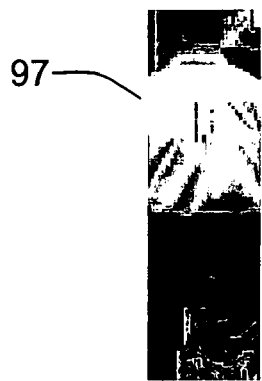
Figure 30B:
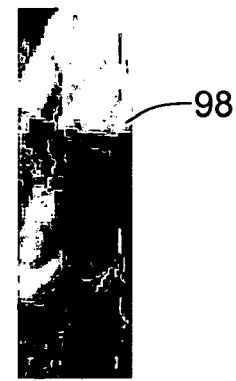

FIGS. 29a, 29b, 30a and 30b represent a scenario of evaluating performance of a multi-resolution histogram representation on prerecorded video sequences that may represent increasingly complex tracking scenarios. In FIG. 29a, the image may be a frame number 101 in a video sequence. Using this image, one may first crop a target patch 97 including one person, as shown in FIG. 29b. The image of FIG. 30a may be a frame number 110 in the same video sequence. By using and matching multi-resolution histograms on the candidate regions in the image frames 101 and 110, one may get a selected image patch 98 from image frame 110, as shown in FIG. 30b. It is evident that the person selected out of the latter image, based on a matching histogram, is the same person in the target patch. This selection reveals good performance of multi-resolution histograms for tracking in a crowded scenario.

Figure 31B:
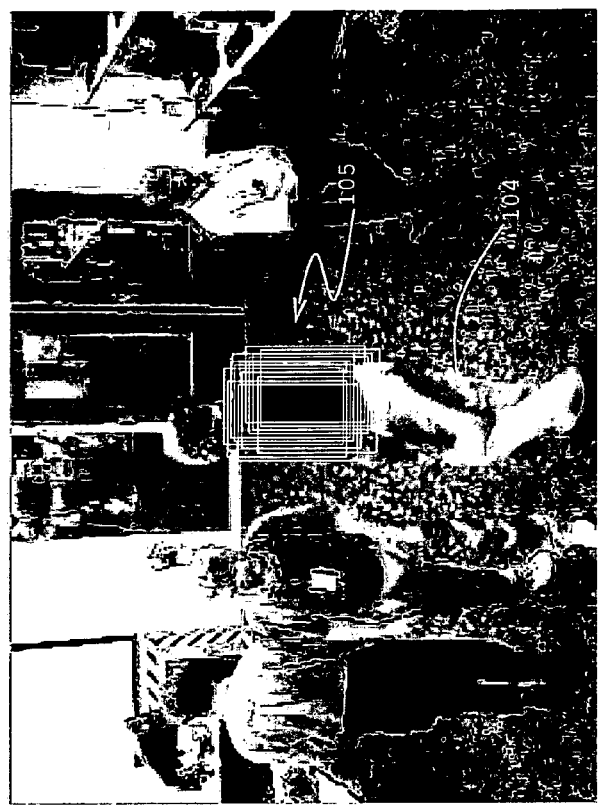
FIGS. 31a and 31b show images having a histogram and particles shown as rectangles of a tracking task.
Figure 31A:
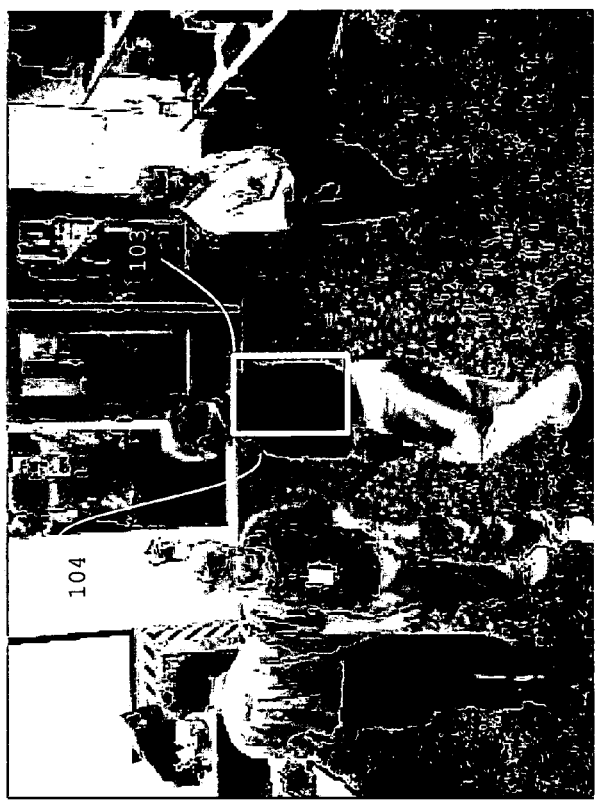

FIG. 31a shows a target patch 103 on a person 104 in a relatively populated area, such as an airport. A color histogram may be taken of the patch 103. FIG. 31b reveals particles 105 shown as rectangles during a tracking task using a particle filter deploying the color histogram representation.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for tracking an object using sequential Monte Carlo (SMS) methods, the method comprising:
   initializing tracking;
   selecting a camera have a field of view;
   selecting an object to be tracked from the camera field of view;
   obtaining a target model of the tracked object;
   generating a first particle of the target model;
   predicting a next time's particle by a dynamic model; and
   calculating features of the first particle.

2. The method of claim 1 further comprising:
   forming candidates from the features;
   matching the target model with the candidates;
   updating the particle; and
   updating the target model.

3. The method of claim 2, wherein the updating the target model comprises reporting tracking based on a location of the particles.

4. The method of claim 2, further comprising:
   changing to a second camera from a first camera;
   transferring the target model of the tracked object from the first camera to the second camera;
   generating a particle;
   predicting a next particle by the target model; and
   calculating features of the particle.

5. The method of claim 4, wherein the field of view does not overlap with the field of view of the first camera.

6. The method of claim 4, further comprising:
   forming candidates from the features;
   matching the target model with the candidates;
   updating the particle;
   reporting tracking based on a location of the particle; and
   updating the target model.

7. The method of claim 6, wherein the field of view does not overlap with the field of view of the first camera.

8. The method of claim 1, wherein a feature of the particle is determined by:
   computing histograms of various level resolution images of the target model;
   normalizing the histograms;
   forming a cumulative histogram from the histograms of the various level resolution images;
   computing difference histograms between the histograms of consecutive various level resolution images; and
   concatenating the difference histograms to determine the feature of the particle.

9. A tracking system comprising:
   a plurality of cameras;
   a camera selector connected to the plurality of cameras; and
   an image processor connected to the plurality of cameras and the camera selector;
   wherein the image processor comprises:
      a target model generator; and
      a particle generator connected to the target model generator.

10. The system of claim 9, wherein:
    each camera of the plurality of cameras is situated at a location of an area; and
    the location of each camera is different from the location of another camera of the plurality of cameras.

11. The system of claim 10, wherein some of the cameras of the plurality of cameras have non-overlapping fields of view.

12. The system of claim 9, wherein the particle generator comprises a particle feature generator.

13. The system of claim 12, wherein the image processor further comprises:
    a candidate generator connected to the particle generator; and
    a matcher connected to the candidate generator and the target model generator.

14. The system of claim 13, wherein the particle feature generator comprises a histogram generator.

* * * * *